United States Patent [19]

Suzuki

[11] Patent Number: 4,876,493

[45] Date of Patent: Oct. 24, 1989

[54] MOTOR CONTROLLING SWITCH DEVICE

[75] Inventor: Masaru Suzuki, Aichi, Japan

[73] Assignee: Kabushiki Kaisha Tokai Rika Denki Seisakusho, Aichi, Japan

[21] Appl. No.: 137,083

[22] Filed: Dec. 23, 1987

[30] Foreign Application Priority Data

Dec. 24, 1986 [JP] Japan .............................. 61-202290
Mar. 31, 1987 [JP] Japan .............................. 62-49733
Mar. 31, 1987 [JP] Japan .............................. 62-49730
Mar. 31, 1987 [JP] Japan .............................. 62-49731

[51] Int. Cl.$^4$ .......................... H02P 1/22; B60J 1/17; H01H 21/00; H01H 71/18
[52] U.S. Cl. .................................. 318/293; 337/140; 318/280
[58] Field of Search ................. 200/12; 337/3, 8, 140; 318/280, 293

[56] References Cited

U.S. PATENT DOCUMENTS 4,551,660 11/1985 Suzuki .............................. 200/12 X Primary Examiner—J. R. Scott
Attorney, Agent, or Firm—Finnegan, Henderson, Farabow, Garrett, & Dunner

[57] ABSTRACT

A motor controlling switch device is disclosed which comprises a casing and an operating member provided in a casing which is movable from an original position and a first operating position and from the first operating position to a second operating position. A depressing piece is disposed in one of the casings and the operating member. Sloped surfaces and holding surfaces are formed in the casing and the operating member and coact with the depressing piece, respectively, for storing the operating member to the original position when the force on the operating member is released after it has moved to the first operating position and for holding the operating member in the second operating position when the operating member is moved through the first operating position. Forward and reverse rotation switches ae provided for establishing forward and reverse motor rotation circuits when the operating member is moved to the first and second operating positions for forward and reverse rotation. A restoring member of material capable of being stored to its original stretched configuration is disposed in the casing and is supplied through the forward and reverse rotation circuits with a locking current which flows through an electric motor when the operating member moves to the second operating position.

43 Claims, 15 Drawing Sheets

MOTOR CONTROLLING SWITCH DEVICE

BACKGROUND OF THE INVENTION

1. Field of the Invention

The present device relates to a motor controlling, switch device suitable for controlling an electric motor which is used in a power window regulator, power sunroof or the like of an automobile.

2. Description of the Prior Art

In the prior art, for example, the power window of an automobile is equipped with a knob which is situated in a casing so that a restoring force is applied to the knob, thereby normally keeping it in its original position. The knob is moved from the original position to a first operating position by depressing it. The knob is turned from the first operating position to a second operating position by depressing it again. Thus, the knob is designed to operate in two steps. When the knob is positioned in the first or second operating position, a motor operating switch is turned on to complete the electric circuit for forward or reverse rotations of the motor to thereby open or close the window glass. There is also provided a holding switch which, when the knob is moved to the second operating position, is turned on to apply an electric current to the coil of an electromagnet adapted to attract and hold the knob at the second operation position. When the knob is turned to the first operating position, the window glass is continuously moved to open or close the window as long as the knob is kept at the first operating position. On the other hand, when the knob is set at the second operating position, the window glass is moved until the window is fully opened or closed even if the knob is released. When the window has been fully opened or closed, the driving motor is stopped and a locking current flows. There is known in the prior art a device which has a restoring member of a made material such as configuration storing or memory alloy to which locking current of 1 motor is applied. The configuration storing alloy is such that when it is heated it is restored to its original, unstretched shape. Thus when the configuration storing alloy is heated by the locking current, the restoring member is returned to its original shape, and the knob is returned to the original position against the attracting and holding force of an electromagnet by the restoring force of the restoring member.

The structure described above has to use the electromagnet to hold the knob in the second operating position and has the disadvantages of high manufacturing cost and power consumption.

In view of the forgoing disadvantages, it is an object of the present invention to provide a motor controlling switch device in which an operating member is returned to its original position, when the motor is stopped, and which need not use any electromagnet so that it is low in manufacturing cost and in power consumption.

SUMMARY OF THE INVENTION

According to the present invention, there is provided a motor controlling switch device comprising: a casing; an operating member provided in the casing, the operating member being movable from an original position to a first operating position and from the first operating position to a second operating position, a depressing piece disposed in one of said casing and the operating member; a first restoring mechanism for restoring said operating member to the original position in cooperation with said depressing piece when the operating member has its operating force released after it has been moved to the first operation position; a mechanism for holding said operating member in the second operating position in cooperation with the depressing piece when said operating member is moved through the first operating position to the second operating position; a switch circuit for supplying a locking current to an electric drive when the operating member is moved to the first and second operating positions; and a second restoring mechanism disposed in the casing for restoring the operating member to the original position, the second restoring mechanism being supplied with the locking current when the operating member is moved to the second operating position, the second restoring mechanism including at least one restoring member made of a configuration storing alloy capable of being restored to its original stretched configuration when it is supplied with the locking current to thereby restore the operating member to its original position from the second operating position through the first operating position.

Also, according to the present invention, there is provided a motor controlling switch device comprising: a casing; an operating member provided in a casing and made movable from an original position to a first operating position and from the first operating position to a second operating position for forward and reverse rotations, respectively; a depressing piece disposed in one of the casing and said operating member; a first restoring mechanism for restoring said operating member to the original position when the operating member has its operating force released after it has been moved to the first operating position; a mechanism for holding the operating member in the second operating position when said operating member is moved through the first operating position to the first operating position; forward and reverse rotation switches for establishing forward and reverse motor rotation circuits when the operating member is moved to the first and second operating positions for the forward and reverse rotations, respectively and for supplying a locking current from an electric motor; a second restoring mechanism disposed in the casing for restoring the operating member to its original position, the second restoring mechanism being supplied with the locking current when the operating member is moved to the second operating position, the second restoring mechanism including at least one restoring member made of a configuration storing alloy capable of being restored to its original stretched configuration when it is supplied with the locking current to thereby restore the operating member to its original position from the second operating position through the first operating position.

According to another aspect of the present invention, there is provided a motor controlling switch device comprising: a casing having stationary contacts; blades disposed in a rocking manner in the casing and having movable contacts coacting with the stationary contacts constituting switches; an operating member provided in the casing and made movable in from an original position to a first operating position and from the first operating position to a second operating position; depressing pieces disposed in the operating member for applying depressing forces to the blades both to bias said operating member to the original position thereby to bring the movable contacts of the switches into an off-state, in which the movable contacts are out of contact with said stationary contacts, and to rock the blades when the operating member is moved to said first and second operating positions, thereby to bring the movable contacts of the switches into an on-state, the movable contacts being in contact with said stationary contacts; sloped surfaces and holding surfaces formed on the blades and coacting with said depressing pieces, respectively, for restoring the operating member to said original position when the operating member has its operating force released after it has been moved to the first operating position and for holding the operating member in the second operating position when the operating member is moved through the first operating position to the second operating position; the switches supplying a locking current through an electric motor, and restoring members disposed in the casing for restoring the operating member to the original position, the restoring members being supplied with the locking current by the switches when the current operating member is moved to at least the second operating position, the restoring members being made of a configuration storing alloy capable of being restored to its original stretched configuration when the second restoring member is supplied with the locking current to thereby restore the operating member to its original position from the second operating position through the first operating position.

BRIEF DESCRIPTION OF THE DRAWINGS

In the accompanying drawings:

FIGS. 1 and 2 are sections taken along line I—I and II—II of FIG. 3, respectively;

FIG. 3 is a top plan view;

FIG. 4 is an exploded perspective view of FIG. 1;

FIGS. 5 and 6 are similar to FIGS. 1 and 2, respectively, but show the operating positions different from those of FIGS. 1 and 2;

FIGS. 7 and 8 are similar to FIGS. 1 and 2, respectively, but show further different operating positions;

FIG. 9 is an electric circuit diagram;

FIGS. 19 an 20 are sections taken along lines XIX—XIX and XX—XX of FIG. 22, respectively;

FIG. 21 is an expploded perspective view showing an essential portion;

FIG. 22 is a top plan view;

FIGS. 23 and 24 are similar to FIGS. 19 and 20, respectively, but show the operating states different from those of FIGS. 19 and 20;

FIGS. 25 and 26 are similar to FIGS. 19 and 20, respectively, but show different operating positions;

FIG. 27 is an electric circuit diagram;

FIGS. 31 and 32 are sections taken along lines XXXI—XXXI and XXXII—XXXII of FIG. 33, respectively;

FIG. 33 is a top plan view;

FIG. 34 is an exploded perspective view of FIG. 31;

FIG. 35 is an electric circuit diagram;

FIGS. 36 and 37 are similar to FIGS. 31 and 32, respectively, but show the operating positions different from those of FIGS. 31 and 32;

FIG. 38 is similar to FIG. 31 but shows further different operating positions;

FIG. 40 is a longitudinal section; and

FIG. 41 is an electric circuit diagram.

DESCRIPTION OF THE PREFERRED EMBODIMENT

The present device will be described in the following with reference to FIGS. 1 to 9 in connection with its first embodiment in which it is applied to a power window regulator switch for an automobile.

Figure 1:
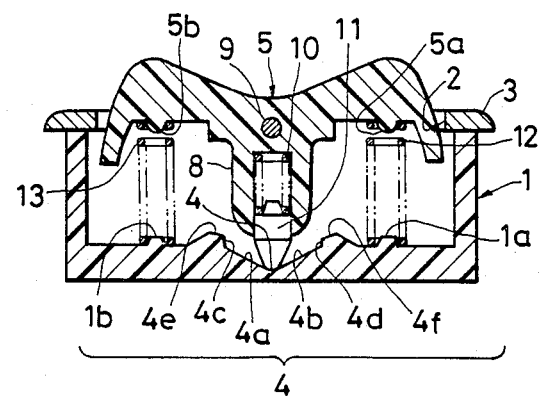
FIGS. 1 to 9 show the first embodiment of the present device.
Figure 2:
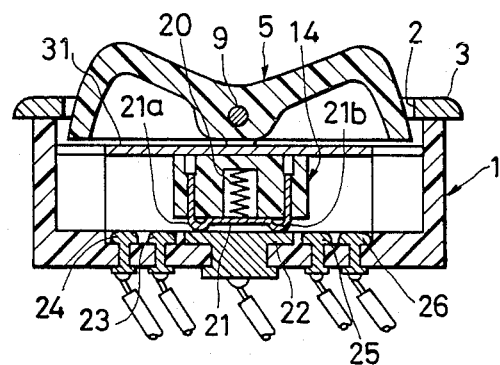
Figure 3:
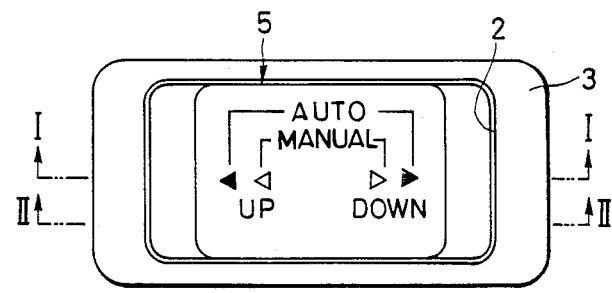
Figure 4:
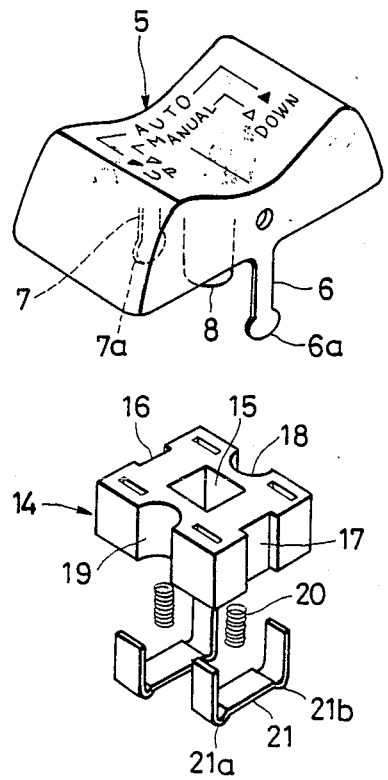
Figure 7:
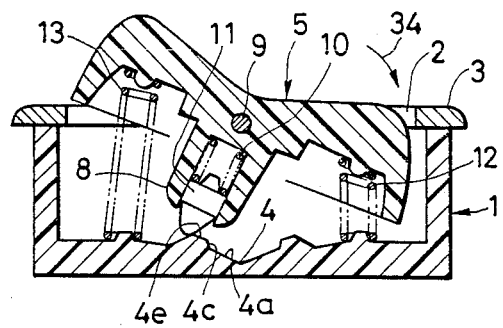
Figure 8:
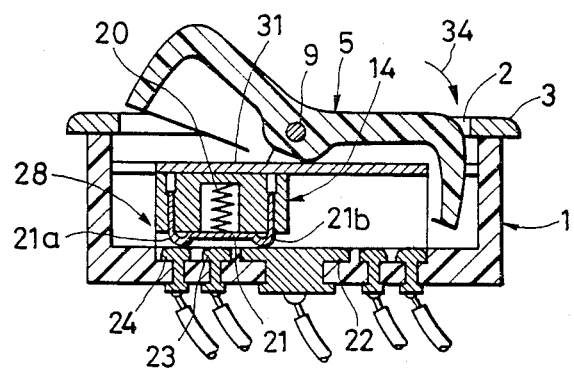
Figure 9:
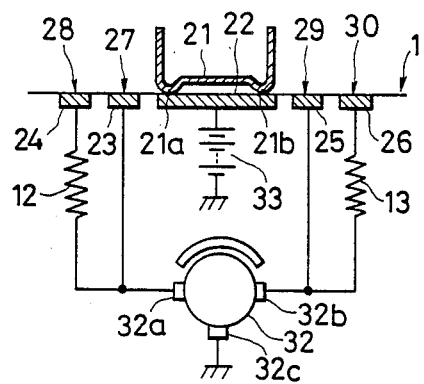

First, the entire arrangement of the switch device will be described with reference to FIGS. 1 to 9. Reference numeral 1 designates a substantially rectangular plastic casing which has its top opening covered with a cover 3 having a substantially rectangular insertion opening 2. A supporting recess 4 extends from the central portion of the bottom wall of the casing 1. The supporting recess 4 has sloped surfaces 4a and 4b which are gradually sloped upward from the lowermost central portion generally in a "V" shape. The sloped surfaces 4a and 4b have steps 4c and 4d thereabove to form holding protrusions 4e and 4f acting as holding surfaces. Reference numeral 5 designates a substantially rectangular plastic knob which has a central part and right-hand and left-hand parts with protrusions 5a and 5b on the inner surface thereof. From the two sides of the central part, there are provided legs 6 and 7 which are protruded downward to have substantially circular depressing protrusions 6a and 7a. A cylinder 8 (FIG. 4) also extends downward from the central part. The knob 5 is pivotally mounted on a pin 9 which extends between the upper portions of the front and rear walls of the casing 1 so that the knob 5 is fitted in the insertion opening 2 of the casing 1. A depressing piece or pressure contactor 11 is fitted in the cylinder 8 through a compression coil spring 10 so that the depressing piece 11 is pushed by the compression coil spring 10 against the central bottom of the supporting recess 4. Thus, the knob 5 is maintained at its original position, as shown in FIG. 1. In this position, the right-hand and left-hand parts of the knob 5 protrude above the insertion opening 2. Reference numerals 12 and 13 designate restoring coil springs which are made of a material such as a configuration storing alloy. The restoring coil springs 12 and 13 have original stretched configurations. When the coil springs 12 and 13 are heated in their compressed states, their configurations are automatically restored to their original stretched configurations. The restoring coil springs 12 and 13 are interposed under tension between the right and left end portions of the knob 5 and the bottom wall of the casing 1, and their upper end portions are held by holding protrusions 1a and 1b which extend from the bottom wall of the casing 1. Reference numeral 14 designates a plastic moving member which is mounted in the casing so that it can move to the right and left. The moving member 14 is provided at its central portion with an insertion hole 15 for inserting the cylinder 8 of the knob 5 thereinto. The moving member 14 is formed in its front and rear walls with guide grooves 16 and 17 in which are fitted the depressing protrusions 6a and 7a of the legs 6 and 7 of the knob 5. Further formed in the right and left walls of the moving member 14 are relief recesses 18 and 19 for receiving the restoring coil springs 12 and 13, as shown in FIG. 4. On the moving member 14, there are mounted movable contact pieces 21 that can move up and down. The movable contact pieces 21 are biased downward by compression coil springs 20. The movable contact pieces 21 are formed with contact portions 21a and 21b. Reference numeral 22 designates a common contact piece which is mounted in the central portion of the bottom wall of the casing 1. Numerals 23 and 24 designate stationary contact pieces which are mounted in the left-hand portion of the bottom wall of the casing 1, whereas numerals 25 and 26 designate stationary contact pieces which are mounted in the right-hand portion of the bottom wall of the casing 1. When the knob 5 is restored to its original position, contact portions 21a and 21b come into contact with the common contact piece 22, as shown in FIG. 2. The movable contact piece 21, the common contact piece 22 and the stationary contact pieces 23 and 24 constitute together first and second switches 27 and 28 for downward movement, whereas the movable contact piece 21, the common contact piece 22 and the stationary contact pieces 25 and 26 constitute together first and second switches 29 and 30 for upward movements. Thus, all the switches 27 to 30 are turned off when the knob is restored to its original position, as shown in FIG. 9. Reference numeral 31 designates a regulating plate which is mounted in the casing 1 so as to prevent the moving member 14 from floating.

Now, the construction of the electric circuit will be described with reference to FIG. 9. Reference numeral 32 designates a three-bush type motor for driving an automobile's power window regulator. This motor 32 has a forward rotation terminal 32a, a reverse rotation terminal 32b and a common terminal 32c. When the motor 32 is rotated in the forward direction, the window glass is moved downward to open the window. When the motor 32 is rotated in the reverse direction, the window glass is moved upward to close the window. Reference numeral 33 designates a battery acting as a DC power source, which has its negative terminal grounded to the earth and its positive terminal connected with the common contact piece 22. The stationary contact pieces 23 and 25 are connected to the forward and reverse rotation terminals 32a and 32b of the motor 32, respectively, and the stationary contact pieces 24 and 26 are connected through the restoring coil springs 12 and 13, respectively, to the forward and reverse rotation terminals 32a and 32b of the motor 32. The common terminal 32c of the motor 32 is grounded to the earth.

The operations of the present embodiment will be described in the following.

Figure 5:
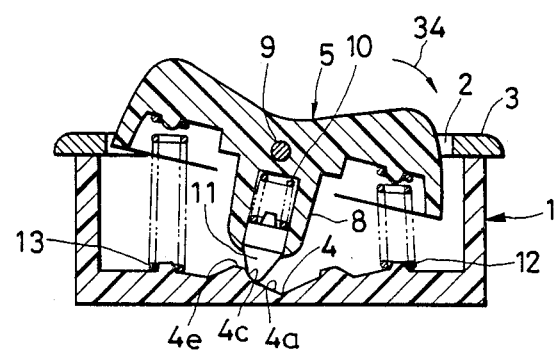
Figure 6:
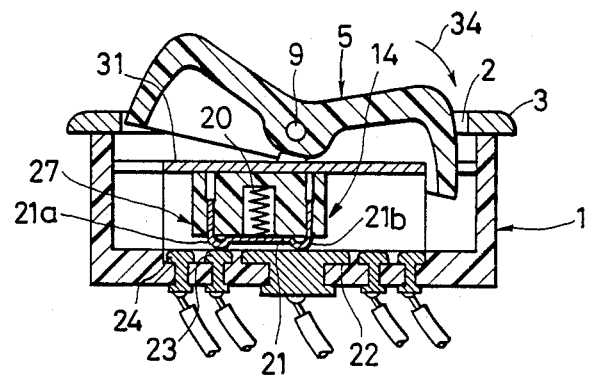

When the right end portion of the knob 5 is depressed to turn the knob 5 in the direction of arrow 34, the depressing piece 11 rides the sloped surface 4a of the supporting recess 4 while compressing the compressing coil spring 10, and abuts against the step 4c at its leading end with resistance. Thus, the knob 5 has been set at a first operating position for the opening operation, as shown in FIG. 5. In this operating position the restoring coil spring 12 is also compressed by the knob 5. When the knob 5 is in the first operating position, the moving member 14 is moved to the left through the depressing protrusions 6a and 7a of the legs 6 and 7 so that the contact portion 21a of the movable contact piece 21 is brought into contact with the stationary contact piece 23 to turn on the first downward switch 27, as shown in FIG. 6. The supply voltage of the battery 33 is applied between the forward rotation terminal 32a and the common terminal 32c of the motor 32 so that the motor 32 is rotated in the forward direction to move the window glass plate downward to open the window. When the knob 5 is then released from the depressing force, the elastic force of the compression coil spring 10 in combination with the coaction of the depressing piece 11 and the sloped portion 4a of the supporting recess 4 causes the depressing piece 11 to slide down the sloped surface 4a. As a result, the knob 5, is turned in the direction opposite to that of the arrow 34 to restore its original position shown in FIGS. 1 and 2 so that the first downward switch 27 is turned off. As the knob 5 is released the restoring coil spring 12 is also restored to its stretched state by its own elastic force. Thus, the window glass has been stopped at the desired position so that the window is opened to the desired degree.

When the knob 5 in the first operating position shown in FIGS. 5 and 6 is depressed so that it is further turned in the direction of the arrow 34, the depressing piece 11 is moved over the step 4c of the sloped surface 3a until it is retained at the left-hand portion of the holding protrusion 4e. The knob 4 is then in a second operating position for the opening operation, as shown in FIG. 7. In this operation, the retaining force of the depressing piece 11 against the holding protrusion 4e is greater than the restoring elastic force of the coil spring 12 so that the knob 5 is held in the second operating position. When the knob 5 is in the second operating position, the moving member 14 is further moved to the left from the position of FIG. 6 to bring the contact portion 21a of the movable contact piece 21 into contact with the stationary contact piece 24 thereby to turn on the second downward switch 28, as shown in FIG. 8. The supply voltage of the battery 33 is applied between the forward rotation terminal 32a and the common terminal 32c of the motor 32 through the restoring coil spring 12 so that the motor 32 rotates forward to move the window glass downward. When the window glass reaches its lowest position so that the window is fully opened, the motor 32 is stopped because the window is in the locked position, and a large locking current flows in the motor 32. This locking current also flows in the restoring coil spring 12 to heat the latter. When the temperature of the coil spring 12 is raised to a predetermined level, the coil spring 12 is restored to its original stretched configuration, as shown in FIG. 1. In this connection, the restoring force is designed so that it is larger than the retaining force of the holding protrusion 4e, which is established by the spring biased depressing piece 11. Accordingly, the depressing piece 11 is forcibly released from the retention by the holding protrusion 4e to slide down the sloped surface 4a of the support recess 4 so that the knob 5 is returned to its original position from the second operating position through the first operating position. Thus, the first downward switch 27 and the second downward switch 28 are turned off.

When the left end portion of the knob 5 is depressed so that the knob 5 is turned in the direction opposite to the direction of the arrow 34, the switch device operates on the same operating principle. When the left end portion of the knob 5 is depressed, the depressing piece 11 is caused to ride over the sloped surface 4b of the supporting recess 4 and abuts against the step 4d. The knob 5 is then on a first operating position for the closing operation. When the left end portion of the knob 5 is further depressed, the depressing piece 11 is moved over the step 4d of the sloped surface 4b until it is retained at the right-hand portion of the holding protrusion 4f. Thus, the knob 5 takes a second operating position for the closing operation. When the knob 5 is moved to the first or second operating position, the restoring coil spring 13 is compressed by the knob 5 while the moving member is moved to the right by the knob 5 to bring the contact portion 21b of the movable contact piece 21 into contact with the stationary contact piece 25 or 26. Thus, the first or second upward switch 29 or 30 is turned on. As a result, the supply voltage of the battery 33 is applied between the reverse rotation terminal 32b and the common terminal 32c of the motor 32 directly or indirectly through the restoring spring 13 to rotate the motor 32 in the reverse direction thereby to move the window glass upward to close the window. If, in this case, the knob 5 is in the first operating position, it is turned back to the original position by the actions of the sloped surface 4b, the compression coil spring 10 and the depressing member 11 of the knob 5 is released from the depressing force. Thus, the first upward switch 29 is turned off. When, on the other hand, the knob 5 is in the second operating position for the closing operation, even if the depression force is eliminated, the knob 5 is held in the second operating position because the depressing member 11 is retained by the holding protrusion 4f, and the second switch 30 is held in the on state. Thereafter, when the window glass reaches its upper most position to fully close the window, the motor 32 is stopped, and the locking current flows in the motor 32 and the restoring coil spring 13. As a result, the coil spring 13 is automatically restored to its original stretched configuration so that the knob 5 is returned to its original position from the second operating position through the first operating position. Thus, the second switch 30 and then the first switch 29 are turned off.

According to the present embodiment, the sloped surfaces 4a and 4b of the supporting recess 4 in the casing 1 are formed with the holding protrusions 4e and 4f for retaining the depressing recess 11 so as to hold the knob 5 in the second operating position. The restoring coil springs 12 and 13, made of a material such as a configuration storing alloy are interposed between the right and left end portions of the knob 5 and the bottom wall of the casing 1 to feed the electric current which flows in the coil spring 12 or 13 and the motor 32. When the window glass is fully opened or fully closed so that the motor 32 is stopped, the coil spring 12 or 13 is heated with the locking current to restore it to its original stretched state. Thus, the knob 5 is automatically restored to its original position against the retention of the holding protrusion 4e or 4f, which is provided by the depressing piece 11, to turn off the second switch 29 or 30. As a result, an electromagnet is not required for holding the knob 5 in the second operating position, which is different from the prior art. The switch device can be manufactured at an accordingly low cost and with an accordingly low power consumption.

Figure 10:
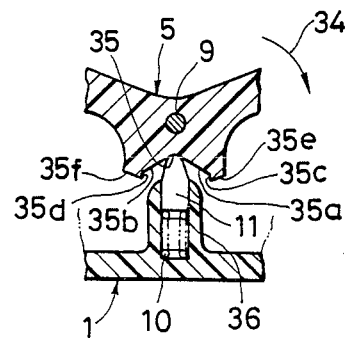
FIG. 10 is a longitudinal section showing the second embodiment of the present device.

FIG. 10 shows a second embodiment of the present device. Only the difference from the foregoing embodiment will be described in the following.

The knob 5 is formed in the lower surface of its central portion with a supporting recess 35. This supporting recess 35 is formed into a substantially inverted "V" shape, in which sloped surfaces 35a and 35b are gradually sloped downward from the uppermost portion of the center to the right and left. Below the sloped surfaces 35a and 35b, there are formed steps 35c and 35d which are then turned obliquely upward to form holding surfaces 35e and 35f acting as holding portions. From the central portion of the bottom wall of the casing 1, there a cylinder 36 is protruded in which is fitted the depressing piece 11 which is biased upwardly through the compression coil spring 10. The depressing piece 11 has its leading end portion abutting against the uppermost portion of the supporting recess 35 to hold the knob 5 in its original position at all times. Thus, when the knob 5 is moved in to the first operating position in the direction of the arrow 34 or in the opposite direction, the depressing piece 11 comes into contact with the step 35c or 35d, while being depressed by the sloped surface 35a or 35b. When this depressing force is released, the knob 5 is returned to its original position by the coactions between the depressing piece 11 and the sloped surface 35a or 35b. When, on the other hand, the knob 5 is moved in to the second operating position in the direction of the arrow 34 or in the opposite direction, the depressing piece 11 is moved over the sloped surface 35a or 35b and the step 35c or 35d and is depressed onto the holding surface 35e or 35f. As a result, the holding surface 35e or 35f retain depressing piece 11 so that the knob 5 is held in the second operating position.

Thus, the second embodiment can attain effects similar to those of the foregoing embodiment.

Figure 11:
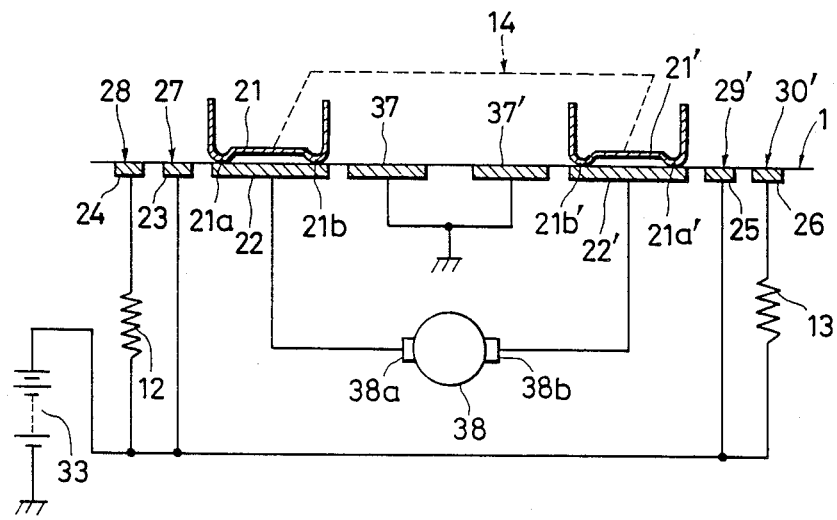
FIG. 11 is similar to FIG. 9 but shows the third embodiment of the present device.

FIG. 11 shows a third embodiment of the present device. Only the components different from those of the first embodiment will be described in the following.

Reference numeral 21' designates a movable contact piece which is moved to the right and left in association with the movable contact piece 21 and which also has contact portions 21a' and 21b'. Numeral 22' designates a common contact piece which is arranged in the bottom wall of the casing 1 and located at the right-hand of the common contact piece 22. When the knob 5, as shown in FIGS. 1 and 10 is in its original position, the contact portions 21a' and 21b' of the movable contact piece 21' are in contact with the common contact piece 22'. The movable contact piece 21' and the stationary contact pieces 25 and 26 constitute first and second upward switches 29' and 30', respectively. Numerals 37 and 37' designate auxiliary contact pieces which are arranged in the bottom wall of the casing 1 and interposed between the common contact pieces 22 and 22'. The auxiliary contact pieces 37 and 37' are commonly connected and grounded to the earth. Numeral 38 designates a two-brush type motor replacing the aforementioned motor 32. Like this motor 32, the two-brush type motor 38 is adapted to move the window glass downward, when rotated in the forward direction, and the same upward when rotated in the reverse direction. The motor 38 has its forward rotation terminal 38a and reverse rotation terminal 38d connected with the common contact terminals 22 and 22', respectively. The battery 33 has its positive terminal connected with the stationary contact pieces 23 and 25 and with the stationary contact pieces 24 and 26 through the restoring coil springs 12 and 13.

When the knob 5 is moved to the first operating position for the opening operation so that the movable contact pieces 21 and 21' are moved to the left by the moving member 14, the contact portion 21a of the movable contact piece 21 comes into contact with the stationary contact piece 23 to run on the first switch 27, and the contact portion 21b' of the movable contact piece 21' comes into contact with the auxiliary contact piece 37'. As a result, the motor 38 is supplied at its positive terminal 38a with the supply voltage by way of the passage of the positive terminal of the battery 33, the first switch 27 (which is composed of the stationary contact piece 23, the movable contact piece 21 and the common contact piece 22), the forward rotation terminal 38a and the reverse rotation terminal 38b of the motor 38, the common contact piece 22', the movable contact piece 21', the auxiliary contact piece 37' and the earth so that it rotates in the forward direction to move the window glass downward. When, on the other hand, the knob 5 is moved to the second operating position for the opening operation, the contact portion 21a of the movable contact piece 21 comes into contact with the stationary contact piece 24 to turn on the second switch 28, and the contact portion 21b' of the movable contact piece 21' also comes into contact with the auxiliary contact piece 37'. As a result, the motor 38 is supplied at its forward rotation terminal 38a with the supply voltage by way of the passage of the positive terminal of the battery 33, the restoring coil spring 12, the second switch 28 (which is composed of the stationary contact piece 24, the movable contact piece 21 and the common contact piece 22), the forward rotation terminal 38a and the reverse rotation terminal 38b of the motor 38, the common contact piece 22', the movable contact piece 21', the auxiliary contact piece 37+ and the earth. When, on the other hand, the knob 5 is moved to the first operating position for the closing operation so that the movable contact pieces 21 and 21' are moved to the right by the moving member 14, the contact portions 21a' of the movable contact piece 21' comes into contact with the stationary contact piece 25 to turn on the first switch 29', and the contact portion 21b of the movable contact piece 21 comes into contact with the auxiliary contact piece 37. As a result, the motor 38 is supplied at its reverse rotation terminal 38b with the supply voltage by way of the passage of the positive terminal of the battery 33, the first switch 29' (which is composed of the stationary contact piece 25, the movable contact piece 21' and the common contact piece 22'), the reverse rotation terminal 38b and the forward rotation terminal 38a of the motor 38, the common contact piece 22, the movable contact piece 21, the auxiliary contact piece 37 and the earth so that it rotates in the reverse direction to move the window glass upward. When, on the other hand, the knob 5 is moved to the second operating position for the closing operation, the contact portion 21a' of the movable contact piece 21' comes into contact with the stationary contact piece 26 to turn on the second switch 30', and the contact portion 21b of the movable contact piece 21 also comes into contact with the auxiliary contact piece 37. As a result, the motor 38 is supplied at its reverse rotation terminal 38b with the supply voltage by way of the passage of the positive terminal of the battery 33, the restoring spring 13, the second switch 30' (which is composed of the stationary contact piece 26, the movable contact piece 21' and the common contact piece 22'), the reverse rotation terminal 38b and the forward rotation terminal 38a of the motor 38, the common contact piece 22, the movable contact piece 21, the auxiliary contact piece 37 and the earth.

Thus, effects similar to those of the foregoing first embodiment can also be attained by the present third embodiment.

Figure 12:
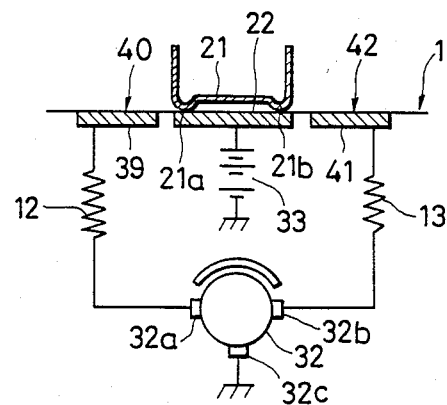
FIG. 12 is also similar to FIG. 9 but shows the fourth embodiment of the present device.

FIG. 12 shows a fourth embodiment of the present device. Components different from those of the first embodiment, as shown in FIG. 9 will be described in the following. Reference numeral 39 designates an elongated stationary contact piece which is formed by integrating the stationary contact pieces 23 and 24. The stationary contact piece 39, together with the movable contact piece 21 and the common contact piece 22 constitute an upward switch 40. The switch 40 is connected with the forward rotation terminal 32a of the motor 32 through the restoring coil spring 12. Numeral 41 designates an elongated stationary contact piece which is formed by integrating the stationary contact pieces 25 and 26. The stationary contact piece 41 constitutes a downward switch 42 together with the movable contact piece 21 and the common contact piece 22. The switch 42 is connected with the reverse rotation terminal 32b of the motor 32 through the restoring coil spring 13.

Thus, even in case the knob 5 is moved to either the first operating position, as shown in FIGS. 5 and 6 or the second operating position, as shown in FIGS. 7 and 8 for the opening operation, the contact portion 21a of the movable contact piece 21 comes into contact with the stationary contact piece 39 to turn on the switch 40. Even in case the knob 5 is moved to the first or second operating position for the closing operation, the contact portion 21b of the movable contact piece 21 comes into contact with the stationary contact piece 41 to turn on the switch 42. As a result, the electric current flows in the restoring coil spring 12, even when the knob 5 is moved to the first operating position for the opening operation, and in the restoring coil spring 13 even when the knob 5 is moved to the first operating position for the closing operation. In this first operating position, the current that flows in the motor 32 is far smaller than the locking current so that the restoring coil springs 12 and 13 are minimally heated.

Thus, effects similar to those of the foregoing first embodiment can also be attained by the present fourth embodiment. This fourth embodiment is especially advantageous in its simple switch structure.

Figure 13:
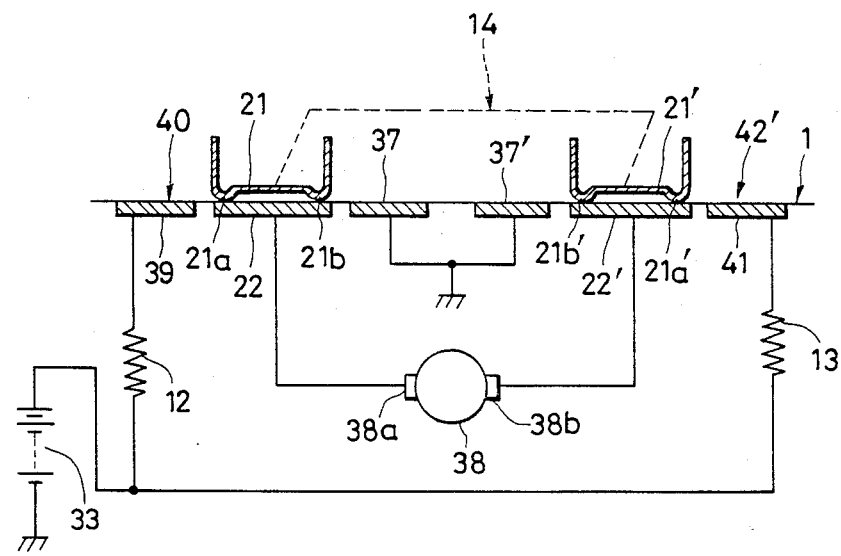
FIG. 13 is similar to FIG. 11 but shows the fifth embodiment of the present device.

FIG. 13 shows a fifth embodiment of the present device. Components different from those of the foregoing third embodiment, as shown in FIG. 11 will be described in the following. The stationary contact pieces 23 and 24 are replaced by the stationary contact member 39 shown in FIG. 12, which is combined with the movable contact piece 21 and the common contact piece 22 to constitute the upward switch 40'. The stationary contact pieces 25 and 26 are also replaced by the stationary contact piece 41 shown in FIG. 12, which is combined with the movable contact piece 21' and the common contact piece 22' to constitute a downward switch 42'.

As a result, effects similar to those of the third embodiment can also be attained by the present fifth embodiment, which is advantageous in its switch structure like the fourth embodiment.

FIGS. 14 to 17 show a sixth embodiment of the present device. Components different from those of the foregoing first embodiment will be described in the following.

Figure 14:
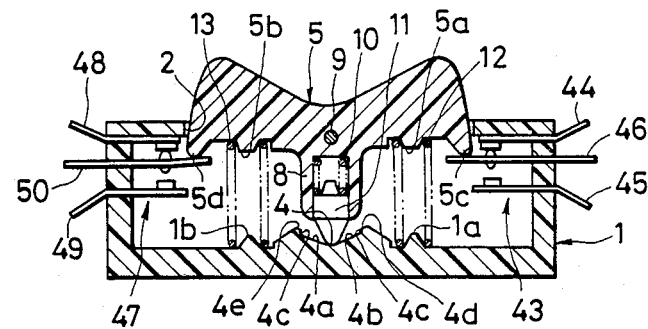
FIGS. 14, 15, 16 and 17 are similar to FIGS. 1, 5, 7 and 9, respectively, but show the sixth embodiment of the present device.

In FIG. 14, reference numeral 43 designates a downward change-over switch which is provided in place of the downward switches 27 and 28. The downward change-over switch 43 is composed of stationary contact pieces 44 and 45 mounted in the right-hand side wall of the casing 1 and a movable contact piece 46 interposed between the stationary contact pieces 44 and 45. The movable contact piece 46 is always in contact with the normally-closed stationary contact piece 44. When the knob 5 is in the direction of the arrow 34 so that the movable contact piece 46 is depressed by the depressing protrusion 5c located at the right-hand end of the knob 5, the movable contact piece 46 comes out of contact with the stationary contact piece 44 (for the off operation) and into contact with the normally-open stationary contact piece 45. Numeral 47 designates an upward change-over switch which is provided in place of the upward switches 29 and 30. The upward change-over switch 47 is composed of stationary contact pieces 48 and 49 mounted in the left-hand side wall of the casing 1 and a movable contact piece 50 interposed between the stationary contact pieces 48 and 49. When the knob 5 is moved in the direction opposite to the direction of the arrow 34 so that the movable contact piece 50 is depressed by the depressing protrusion 5d located at the left-hand end of the knob 5, the movable contact piece 50 comes out of contact with the stationary contact piece 48 and into contact with the normally-open stationary contact piece 49.

Figure 17:
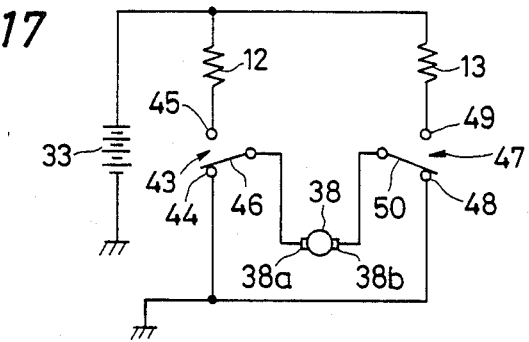

Now, the structure of the electric circuit will be described with reference to FIG. 17. In the downward change-over switch 43 and the upward change-over switch 47 the stationary contact pieces 44 and 48 are grounded to the earth; the stationary contact pieces 45 and 49 are connected with the positive terminal of the battery 33 through the restoring coil springs 12 and 13, respectively; and the movable contact pieces 46 and 50 are connected with the forward rotation terminal 38a and the reverse rotation terminal 38b of the motor 38, respectively.

Figure 15:
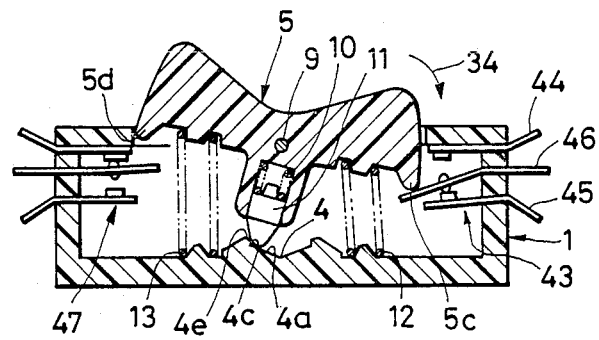
Figure 16:
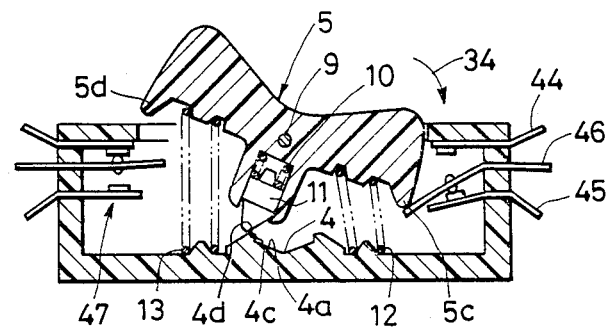

Thus, when the knob 5 is turned in the direction of the arrow 34 to either the first operating position, as shown in FIG. 15 or the second operating position, as shown in FIG. 16 for the opening operation, the movable contact piece 46 of the downward change-over switch 43 is depressed by the depressing protrusion 5c of the knob 5 to turn on the circuit between the movable contact piece 46 and the stationary contact piece 45. In the first or second operating position, the compression coil spring 12 and the motor 38 are supplied with the supply voltage by way of the passage of the positive terminal of the battery 33, the restoring coil spring 12, the stationary contact piece 45 and the movable contact piece 46 of the change-over switch 43, the forward rotation terminal 38a and the reverse rotation terminal 38b of the motor 38, the movable contact piece 50 and the stationary contact piece 48 of the change-over switch 47, and the earth. As a result, the electric current in one direction flows in the motor 38 to rotate the same in the forward direction. When, on the other hand, the knob 5 is turned in the direction opposite to the direction of the arrow 34 to the first or second operating position for the closing operation, the movable contact piece 50 of the upward change-over switch 47 is depressed by the depressing protrusion 5d of the knob 5 to turn on the circuit between the movable contact piece 50 and the stationary contact piece 49. In the first or second operating position, the compression coil spring 13 and the motor 38 are supplied with the supply voltage by way of the passage of the positive terminal of the battery 33, the restoring coil spring 13, the stationary contact piece 49 and the movable contact piece 50 of the change-over switch 47, the reverse rotation terminal 38b and the forward rotation terminal 38a of the motor 38, the movable contact piece 46 and the stationary contact piece 44 of the change-over switch 43, and the earth so that the electric current flows in the other direction in the motor 38 to rotate the same in the reverse direction.

As a result, effects similar to those of the foregoing first and fourth embodiments can also be attained by the present sixth embodiment.

Figure 18:
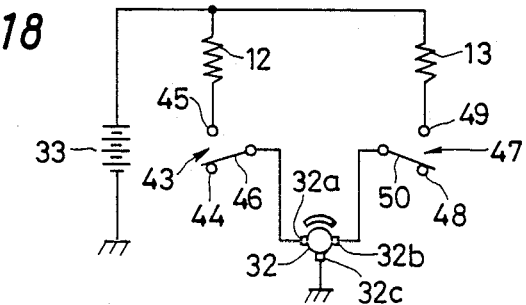
FIG. 18 is similar to FIG. 17 but shows the seventh embodiment of the present device.

FIG. 18 shows a seventh embodiment of the present device. Components difference to those of the foregoing sixth embodiment will be described in the following. This seventh embodiment is different in that the motor 38 is replaced by the motor 32, as shown in FIG. 9. The movable contact pieces 46 and 50 of the change-over switches 43 and 47 are connected with the forward rotation terminal 32a and the reverse rotation terminal 32b of the motor 32, respectively. The common terminal of the motor 32 is grounded to the earth.

Thus, when the circuit between the movable contact piece 46 and the stationary contact piece 45 of the downward change-over switch 43 is turned on, the compression coil spring 12 and the forward rotation terminal 32a of the motor 32 are supplied with the supply voltage. When, on the other hand, the circuit between the movable contact piece 50 and the stationary contact piece 49 of the upward change-over switch 47 is turned on, the compression coil spring 13 and the reverse rotation terminal 32b of the motor 32 are supplied with the supply voltage.

As a result, effects similar to those of the foregoing sixth embodiment can also be attained by the present seventh embodiment, which is especially advantageous in that the stationary contact pieces 44 and 48 of the change-over switches 43 and 47 can be dispensed with.

The individual embodiments thus far described are directed to the case in which the present device is applied to the power window regulator switch device. The present device should not be limited thereto but can be applied generally to a motor controlling switch device such as power sunroof switch device or power curtain switch device.

In addition, the present device should not be limited to the embodiments thus far described with reference to the accompanying drawings but can naturally be modified in various manners within the spirit thereof. For example, overcurrent protecting shunt resistors may be connected in parallel with the restoring coil springs 12 and 13 acting as the restoring members.

An eighth embodiment of the invention will be described in the following with reference to FIGS. 19 to 27.

Figure 19:
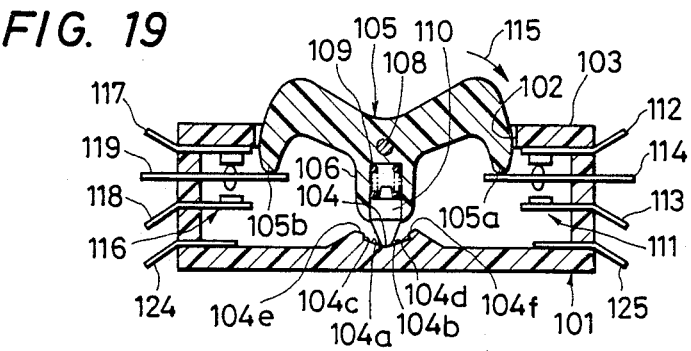
FIGS. 19 to 27 show the eighth embodiment of the present device.
Figure 20:
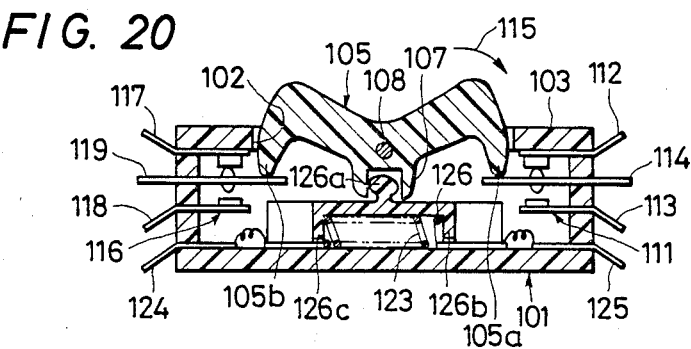
Figure 21:
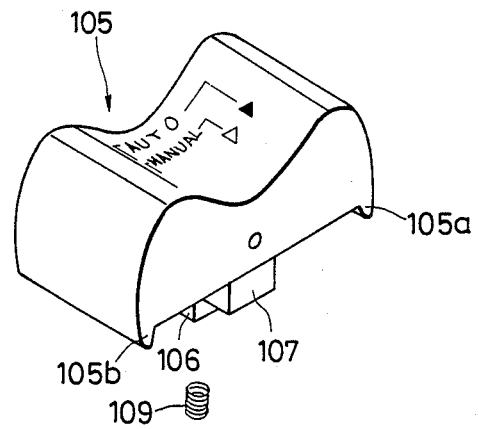
Figure 21:
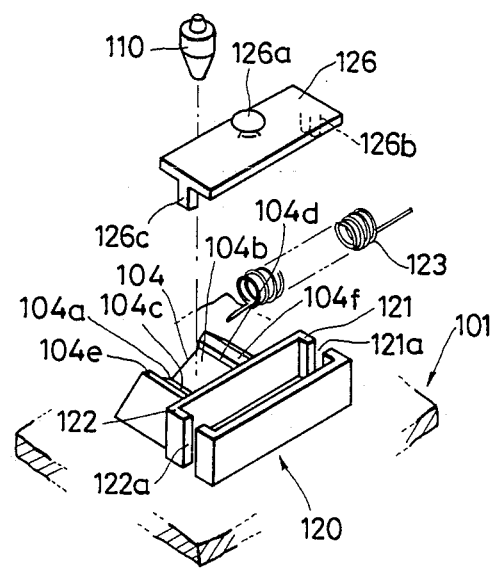
Figure 22:
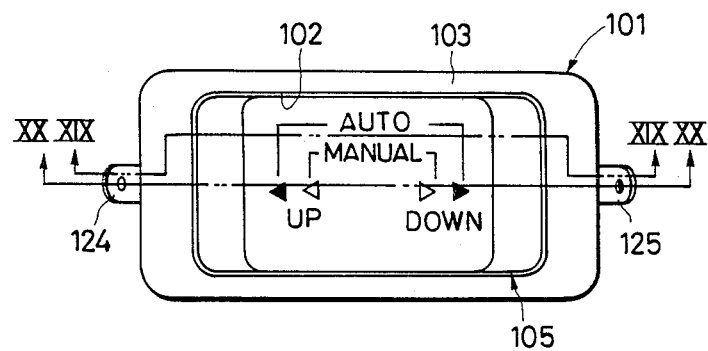

First, the entire arrangement of the switch device will be described with reference to FIGS. 19 to 26. Reference numeral 101 designates a substantially rectangular plastic casing which has its top opening covered with a cover 103 having a substantially rectangular insertion opening 102. A supporting recess 104 is extended from the central portion of the bottom wall of the casing 101. The supporting recess 104 has sloped surfaces 104a and 104b which are sloped gradually upward from the lowermost central portion generally in a "V" shape. The sloped surfaces 104a and 104b have steps 104c and 104d to form holding protrusions 104e and 104f acting as holding surfaces. Reference numeral 105 designates a substantially rectangular plastic knob which has a central part and right-hand and left-hand parts with protrusions 105a and 105b on the inner surface thereof. From the central part, cylinders 106 and 107 protruded downwardly. The knob 105 is pivotally mounted on a pin 108 which is extended between the upper portions of the front and rear walls of the casing 101 such that the knob 105 is fitted in the insertion opening 102 of the casing 101. A depressing piece 110 is fitted in the cylinder 106 through a compression coil spring 109 such that the depressing piece 110 is pushed by the compression coil spring 109 against the central bottom of the supporting recess 104 so that the knob 105 is maintained at its original position, as shown in FIG. 19. In this position, the right-hand and left-hand parts of the knob 105 protrude above the insertion opening 102. Reference numeral 111 designates a downward change-over switch for forward rotations. This change-over switch is composed of stationary contact pieces 112 and 113 mounted in the right-hand wall of the casing 101 and a movable contact piece 114 interposed between the stationary contact pieces 112 and 113. The movable contact 114 is always in contact with the normally-closed stationary contact piece 112. When the knob 105 is turned in the direction of arrow 115 so that the movable contact piece 114 is depressed by the depressing protrusion 105a located at the right-hand end portion of the knob 105 the movable contact piece 114 of change over switch 111 is brought out of contact with the stationary contact piece 112 and into contact with the normally-open stationary contact piece 113. Numeral 116 designates an upward change-over switch for reverse rotations. This change-over switch 116 is composed of stationary contact pieces 117 and 118 mounted in the left-hand wall of the casing 101 and a movable contact piece 119 interposed between the stationary contact pieces 117 and 118. When the knob 105 is turned in the direction opposite to the direction of the arrow 115 to depress the movable contact piece 119 with its depressing protrusion at the left-hand end portion, movable contact piece 119 of the change-over switch 116 is brought out of contact with the stationary contact piece 117 and into contact with the normally-open stationary contact piece 118. Numeral 120 designates a horizontally elongated rectangular holding frame, as shown in FIG. 21 which is molded integrally with the bottom wall of the casing 101. The holding frame 120 has its right- and left-hand side walls providing stoppers 121 and 122. These stoppers 121 and 122 are formed at their central portions with slits 121a and 122a which are vertically extended to have their upper ends opened. A single restoring coil spring 123 made of a configuration storing alloy is held in the holding frame 120 such that it is sandwiched between the stoppers 121 and 122. This restoring coil spring 123 has an original stretched configuration. When the coil spring 123 is heated in its compressed state, its original stretched configuration is automatically restored. The restoring coil spring 123 has its two end portions connected through the lower portions of the slits 121a and 122a with terminals 124 and 125 which are mounted in the left- and right-hand side walls of the casing 101. Numeral 126 designates a plastic moving member which moves to the right and left in the casing 101. The moving member 126 is formed at its central portion with a fitting protrusion 126a which is fitted in the cylinder 107 of the knob 105. From the two end portions of the moving member 126, there are protruded downward two operating protrusions 126b and 126c which are adapted to abut against the two end portions of the restoring coil spring 123 through the slits 121a and 122a.

Figure 27:
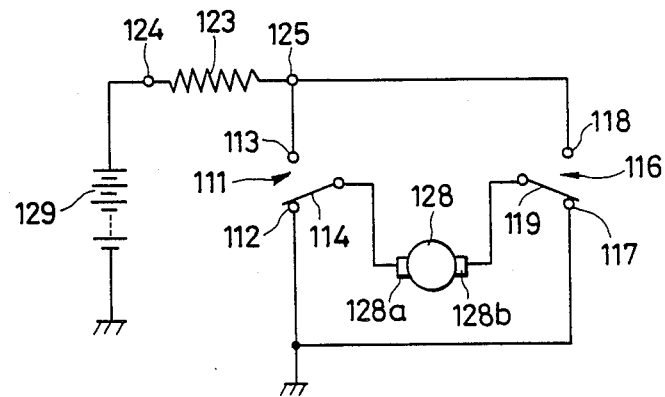

Now, the construction of the electric circuit will be described with reference to FIG. 27. Reference numeral 128 designates a two-brush type motor for driving an automobile's power window regulator. This motor 128 has a forward rotation terminal 128a and a reverse rotation terminal 128b. When the motor 128 is rotated in the forward direction, the window glass is moved downward to open the window. When the motor 128 is rotated in the reverse direction, the window glass is moved upward to closed the window. Numeral 129 designates a battery acting as a DC power source, which has its negative terminal grounded to the earth and its positive terminal connected through the terminal 124, the restoring coil spring 123 and the terminal 125 with the stationary contact pieces 113 and 118 of the change-over switches 111 and 116. In these change-over switches 111 and 116, the stationary contact pieces 112 and 117 are grounded to the earth, and the movable contact pieces 114 and 119 are connected with the forward rotation terminal 128a and the reverse rotation terminal 128b of the motor 128, respectively.

The operation of the eighth embodiment will be described in the following.

Figure 23:
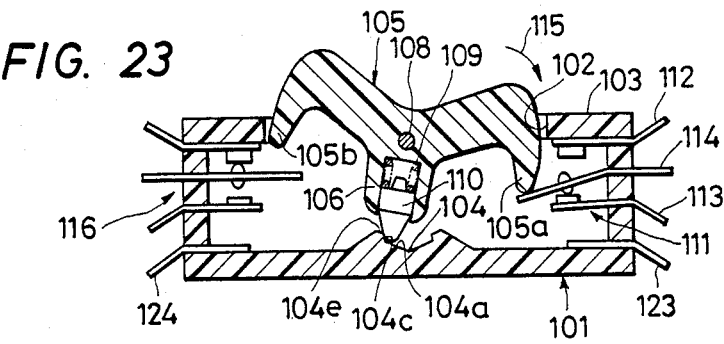

When the right end portion of the knob 105 is depressed to turn the knob 105 in the direction of arrow 115, the depressing piece 110 rides the sloped surface 104a of the supporting recess 104 while compressing the compressing coil spring 109, and abuts against the step 104c at its leading end with resistance. The knob 105 is thus in a first operating position for the forward rotations for the opening operation, as shown in FIG. 23. When the knob 105 is in the first operating position, the moving member 126 is moved to the left through the cylinder 107 and the fitting protrusion 126a so that the restoring coil spring 123 is depressed and compressed by the operating protrusion 126a. When, on the other hand, the knob 105 is turned in the direction of the arrow 115, the movable contact piece 114 of the downward change-over switch 111 is depressed by the depressing protrusion 105a of the knob 105 to turn off the circuit between the movable contact piece 114 and the stationary contact piece 112 and then turn on the circuit between the movable contact piece 114 and the stationary contact piece 113. Then, the forward rotation circuit of the motor 128 is established by way of the passage of the positive terminal of the battery 129, the restoring coil spring 123, the stationary contact piece 113 and the movable contact piece 114 of the change-over switch 111, the forward rotation terminal 128a and the reverse rotation terminal 128b of the motor 128, the movable contact piece 119 and the stationary contact piece 117 of the change-over switch 116, and the earth. As a result, the motor 128 is supplied with the electric current in one direction so that it is rotated in the forward direction to move the window glass downward thereby to open the window. In this connection, the current of the forward rotation circuit of the motor 128 also flows in the restoring coil spring 123 but is far smaller than the locking current of the motor 128 so that the restoring coil spring 123 is minimally heated. When the knob 105 is then released from the depressing force, the elastic force of the compression coil spring 109 in combination with the coaction of the depressing piece 110 and the sloped portion 104a of the supporting recess 104 causes the depressing piece 110 to slide down the sloped surface 104a. As a result, the knob 105 is turned in the direction opposite to that of the arrow 115 to restore its original position shown in FIGS. 19 and 20 so that the downward change-over switch 111 turns off the circuit between the movable contact piece 114 and the stationary contact piece 113. As the knob 105 is turned, the restoring coil spring 123 is also restored to its stretched state by its own elastic force. Thus, the window glass has been stopped at the desired position so that the window is opened to the desired degree.

Figure 24:
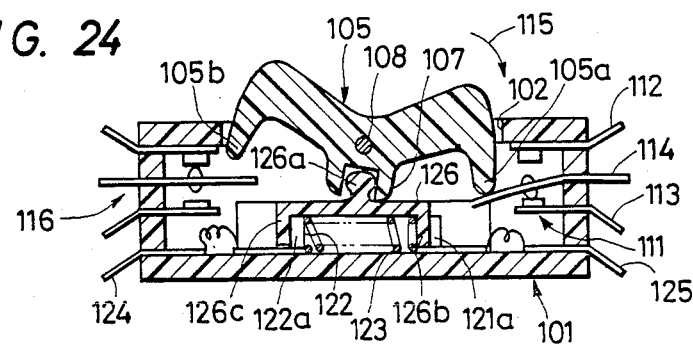
Figure 25:
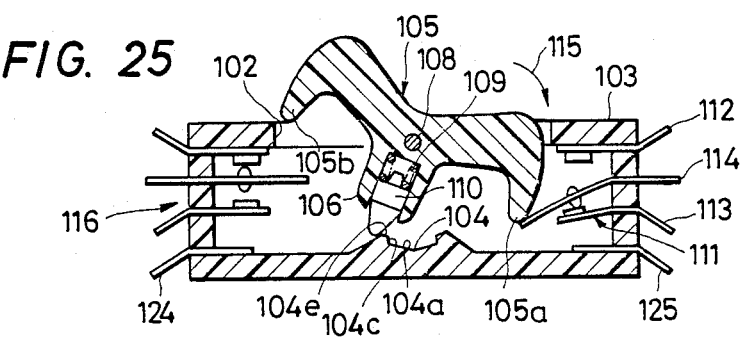
Figure 26:
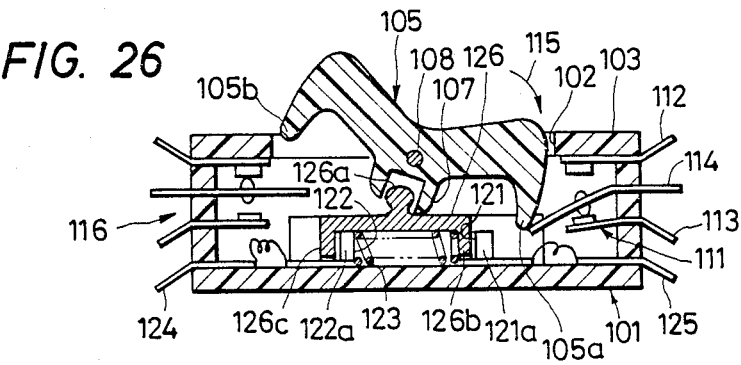

When the knob 105 in the first operating position shown in FIGS. 23 and 24 is depressed so that it is further turned in the direction of the arrow 115, the depressing piece 110 is moved over the step 104c of the sloped surface 104a unit it is retained at the left-hand portion of the holding protrusion 104e. The knob 105 is then in a second operating position for the opening operation, as shown in FIG. 25. Then, the restoring coil spring 123 is depressed into a compressed form by the operating protrusion 126b of the moving member 126, as shown in FIG. 26. In this connection, the retaining force of the holding protrusion 104e of the spring biased depressing piece 110 greater than the restoring elastic force of the restoring coil spring 123 so that the knob 105 is held in the second operating position. Thus, when the knob 105 is moved to the second operating position, the movable contact piece 114 is further depressed than in the first operating position by the depressing protrusion 105a of the knob 105 to turn off the circuit between the movable contact piece 114 and the stationary contact piece 112 of the change-over switch 111 and turn on the circuit between the movable contact piece 114 and the stationary contact piece 113. As a result, the restoring coil spring 123 is energized, and the motor 128 is also energized in one direction so that the window glass is moved downward. When the window glass reaches its lowest position so that the window is fully opened, the motor 128 is stopped, and a large locking current flow in the motor 128. This locking current also flows in the restoring coil spring 123 to heat the latter when the temperature of the coil spring 123 is raised, to a predetermined level, the coil spring 123 is restored to its original stretched configuration, as shown in FIG. 20. The restoring force turns the knob 105 in the direction opposite to the direction of the arrow 115 through the moving member 126. In this connection, the restoring force is designed so that it is larger than the retaining force of the holding protrusion 104e, which is established by the spring biased depressing piece 110. Accordingly, the depressing piece 110 is forcibly released from the retention by the holding protrusion 104e to slide down the sloped surface 104a of the supporting recess 104 so that the knob 105 is returned to its original position from the second operating position through the first operating position to turn off the circuit between the movable contact piece 114 and the stationary contact piece 113 of the downward change-over switch 111 and then to turn on the circuit between the movable contact piece 114 and the stationary contact piece 112.

When the left end portion of the knob 105 is depressed so that the knob 105 is turned in the direction opposite to the direction of the arrow 115, the switch device operates on the same operating principle as where the window glass is moved downward by turning the knob in the direction of the arrow 115. When the left end portion of the knob 105 is depressed, the depressing piece 110 rides over the sloped surface 104b of the support recess 104 and abuts against the step 104d. Thus, the knob 105 has taken a first operating position for the closing operation. When the left end portion of the knob 105 is further depressed, the depressing piece 110 is moved over the step 104d of the sloped surface 104b until it is retained at the right-hand portion of the holding protrusion 104f. Thus, the knob 105 is in a second operating position for the closing operation. When the knob 105 is moved to the first or second operating position, the moving member 126 is moved to the right by the knob 105 so that the restoring coil spring 123 is depressed and compressed by the operating protrusion 126c of the moving member 126. At the same time, the movable contact piece 119 of the upward change-over switch 116 is depressed by the depressing protrusion 105b of the knob 105 to turn off the circuit between the movable contact piece 119 and the stationary contact piece 117 and to turn on the circuit between the movable contact piece 119 and the stationary contact piece 118. As a result, the reverse rotation circuit of the motor 128 is established by way of the passage of the positive terminal of the battery 129, the restoring coil spring 123, the stationary contact piece 118 and the movable contact piece 119 of the change-over switch 116, the reverse rotation terminal 128b and the forward rotation terminal 128a of the motor 128, the movable contact piece 114 and the stationary contact piece 112 of the change-over switch 111, and the earth to supply the motor 128 with the electric current in the other direction to rotate the motor 128 in the reverse direction thereby to move the window glass upward to close the window. If, in this case, the knob 105 is in the first operating position, it is turned back to the original position by the actions of the sloped surface 104b, the compression coil spring 109 and the depressing piece 110 if the knob 105 is released from the depressing force. Thus, the circuit between the movable contact piece 119 and the stationary contact piece 118 of the upward change-over switch 116 is turned off. When, on the other hand, the knob 105 is in the second operating position for the closing operation, even if the depression force is eliminated, the knob 105 is held in the second operating position because the depressing piece 110 is retained by the holding protrusion 104f, and the circuit between the movable contact piece 119 and the stationary contact piece 118 of the change-over switch 116 is held in the on state. Thereafter, when the window glass reaches its uppermost position to fully close the window, the motor 128 is stopped, and the locking current flows in the motor 128 and the restoring coil spring 123. As a result, the coil spring 123 is automatically restored to its original stretched configuration so that the knob 105 is returned to its original position from the second operating position through the first operating position. Thus, the circuit between the movable contact piece 119 and the stationary contact piece 118 of the change-over switch 116 is turned off.

According to the present embodiment, the sloped surfaces 104a and 104b of the supporting recess 104 in the casing 101 are formed with the holding protrusions 104e and 104f for retaining the depressing piece 110 so as to hold the knob 105 in the second operating position. The moving member 126 is also provided, which is moved as the knob 105 is turned. Further provided is the restoring coil spring 123 of a configuration storing alloy, which is compressed by that moving member 126 to feed the restoring coil spring 123 with the electric current which flows in the forward rotation circuit and the reverse rotation circuit of the motor 128. When the window glass is fully opened or fully closed so that the motor 128 is stopped the restoring coil spring 123 is heated with the locking current to restore it to its original stretched state stored. Thus, the knob 105 is automatically restored to its original position against the retention of the holding protrusion 104e or 104f, which is provided by the depressing piece 110. As a result, an electromagnet is not required for holding the knob 105 in the second operating position, which is different from the prior art. It is sufficient to provide only one restoring coil spring 123 in the forward rotation circuit and the reverse rotation circuit of the motor 128. The switch device can be manufactured at an accordingly low cost and with an accordingly low power consumption.

It is also possible to apply to the foregoing embodiment (eighth embodiment) the reverse arrangement as shown in FIG. 10. It is appreciated that this modification can attain effects similar to those of the foregoing embodiment.

Figure 28:
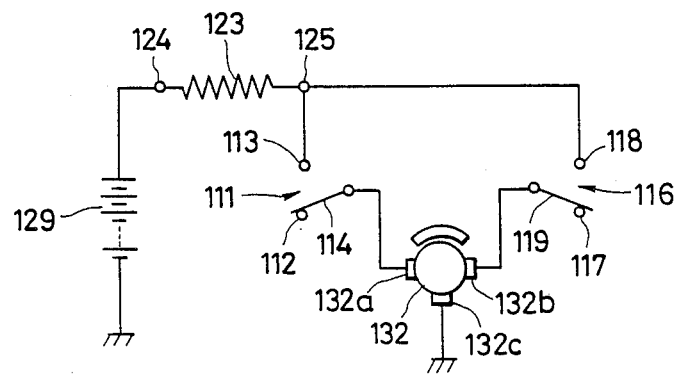
FIG. 28 is similar to FIG. 27 but shows the ninth embodiment of the present device.

FIG. 28 shows a ninth embodiment of the present device. Only the components different from those of the eighth embodiment will be described in the following. Reference numeral 132 designates a three-brush type motor which is used in place of the motor 128 shown in FIG. 27. The three-brush type motor 132 has a forward rotation terminal 132a, a reverse rotation terminal 132b and a common terminal 132c. The motor 132 is constructed, for example, to move the window glass downward to open the window, when it is rotated in the forward direction, and to move the same upward to close the window when rotated in the reverse direction. In this motor 132 the forward rotation terminal 132a is connected with the movable contact piece 114 of the downward change-over switch 111; the reverse rotation terminal 132b is connected with the movable contact piece 119 of the upward change-over switch 116; and the common terminal 132c is grounded to the earth. The change-over switches 111 and 116 have individual stationary contact pieces 113 and 118 which are connected with the terminal 125 of the restoring coil spring 123 and individual stationary contact pieces 112 and 117.

When the circuit between the movable contact piece 114 and the stationary contact piece 113 of the downward change-over switch is turned on, the forward rotation circuit of the motor 132 is established by way of the passage of the positive terminal of the battery 129, the restoring coil spring 123, the stationary contact piece 113 and the movable contact piece 114 of the change-over switch 111, and the forward rotation terminal 132a and the common terminal 132c of the motor 132. When, on the other hand, the circuit between the movable contact piece 119 and the stationary contact piece 118 of the upward change-over switch 116 is turned on, the reverse rotation terminal of the motor 132 is established by way of the passage of the positive terminal of the battery 129, the restoring coil spring 123, the stationary contact piece 118 and the movable contact piece 119 of the change-over switch 116, and the reverse rotation terminal 132b and the common terminal 132c of the motor 132.

As a result, effects similar to the foregoing eighth embodiment can also be attained by the present ninth embodiment.

Figure 29:
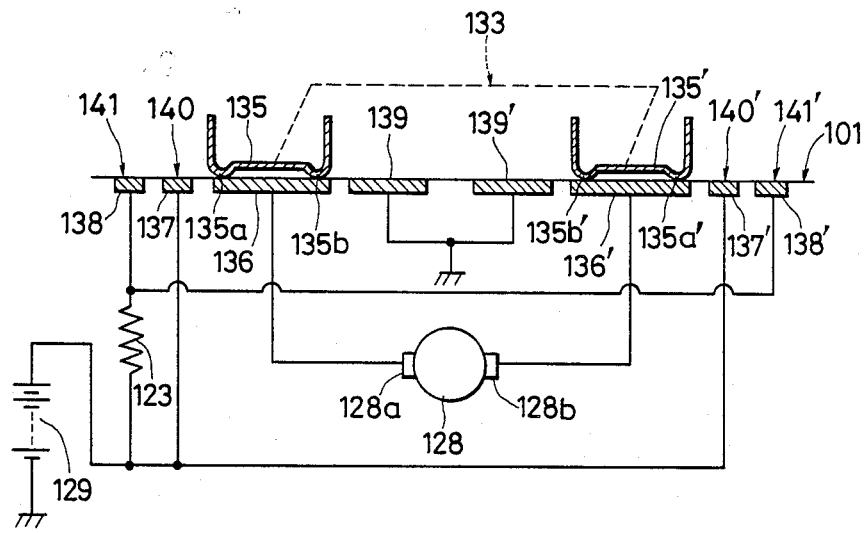
FIG. 29 is an electric circuit diagram showing the tenth embodiment of the present device.

FIG. 29 shows a tenth embodiment of the present invention. The structure of the electric circuit for the tenth embodiment will be described with reference to FIG. 29. The common contact pieces 136 and 136' are connected with the forward rotation terminals 128a and 128b of the motor 128, respectively. Both the stationary contact pieces 137 and 137' are connected with the positive terminal of the battery 129. The stationary contact pieces 138 and 138' are connected with the positive terminal of the battery 129 commonly through the restoring coil spring 123. Both the auxiliary contact pieces 139 and 139' are grounded to the earth.

When the knob 105 is moved to the first operating position at the first step for the opening operation so that the movable contact pieces 135 and 135' are moved to the left through the moving member 133, the contact portion 135a of the movable contact piece 135 comes into contact with the stationary contact piece 137 to turn on the first switch 140, and the contact portion 135b' of the movable contact piece 135' comes into the auxiliary contact piece 139'. As a result, the forward rotation circuit of the motor 128 is established by way of the passage of the positive terminal of the battery 129, the first switch 140 (which is composed of the stationary contact piece 137, the movable contact piece 135 and the common contact piece 136), the forward rotation terminal 128a and the reverse rotation terminal 128b of the motor 128, the common contact piece 136', the movable contact piece 135', the auxiliary contact piece 139' and the earth so that the motor 128 is turned in the forward direction to move the window glass downward. When, on the other hand, the knob 105 is turned to the second operating position at the second step for the opening operation, the contact portion 135a of the movable contact piece 135 comes into contact with the stationary contact piece 138 to turn on the second switch 141, and the contact portion 135b' of the movable contact piece 135' also comes into contact with the auxiliary contact piece 139'. As a result, the forward rotation circuit of the motor 128 is established by way of the passage of the positive terminal of the battery 129, the restoring coil spring 123, the second switch 141 (which is composed of the stationary contact piece 138, the movable contact piece 135 and the common contact piece 136), the positive rotation terminal 128a and the reverse rotation terminal 128b of the motor 128, the common contact piece 136', the movable contact piece 135', the auxiliary contact piece 139' and the earth. When, on the other hand, the knob 105 is moved to the first operating position for the closing operation so that the movable contact pieces 135 and 135' are moved to the right through the moving member 133, the contact portion 135a' of the movable contact piece 135' comes into contact with the stationary contact piece 137' to turn on the first switch 140', and the contact portion 135b of the movable contact piece 135 comes into contact with the auxiliary contact piece 139. As a result, the reverse rotation circuit of the motor 128 is established by way of the passage of the positive terminal of the battery 129, the first switch 140' (which is composed of the stationary contact piece 137', the movable contact piece 135' and the common contact piece 136'), the reverse rotation terminal 128b and the forward rotation terminal 128a of the motor 128, the common contact piece 136, the movable contact piece 135, the auxiliary contact piece 139 and the earth so that the motor 128 is turned in the reverse direction to move the window glass upward. When, on the other hand, the knob 105 is turned to the second operating position for the closing operation, the contact portion 135a' of the movable contact piece 135' comes into contact with the stationary contact piece 138' to turn on the second switch 141', and the contact portion 135b of the movable contact piece 135 also comes into contact with the auxiliary contact piece 139. As a result, the reverse rotation circuit of the motor 128 is established by way of the passage of the positive terminal of the battery 129, the restoring coil spring 123, the second switch 141' (which is composed of the stationary contact piece 138', the movable contact piece 135' and the common contact piece 136'), the reverse rotation terminal 128b and the forward rotation terminal 128a of the motor 128, the common contact piece 136, the movable contact piece 135, the auxiliary contact piece 139 and the earth.

Thus, effects similar to those of the foregoing first embodiment can also be attained by the present tenth embodiment, which is advantageous in that no current flows in the restoring coil spring 123 in the first operating position for either the opening or closing operation.

Figure 30:
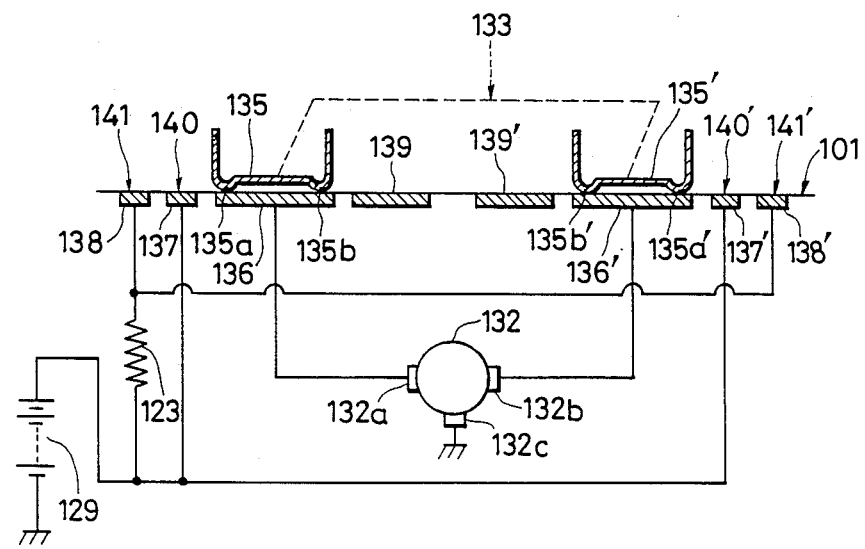
FIG. 30 is similar to FIG. 21 but shows the eleventh embodiment of the present device.

FIG. 30 shows an eleventh embodiment of the present device. In this eleventh embodiment, the motor 128 is replaced by the three-brush type motor 132 shown in FIG. 28. In this motor 132, the forward rotation terminal 132a and the reverse rotation terminal 132b are connected with the common contact pieces 136 and 136' respectively, and the common terminal 132c is grounded to the earth. However, the auxiliary contact pieces 139 and 139' are not grounded to the earth.

In the first operating position at the first step for the opening operation, the forward rotation circuit of the motor 132 is established to supply the supply voltage to the forward rotation terminal 132a of the motor 132 through the first switch 140. In the second operating position at the second step for the same operation, the forward rotation circuit of the motor 132 is established to supply the supply voltage to the positive terminal 132a of the motor through the restoring coil spring 123 and the second switch 141. In the first operating position for the closing operation, on the other hand, the reverse rotation circuit of the motor 132 is established to supply the supply voltage to the reverse rotation terminal 132b of the motor through the first switch 140'. In the second operating position for the same operation, the reverse rotation circuit of the motor 132 is established through the restoring coil spring 123 and the second switch 141'.

The individual embodiments thus far described are directed to the case in which the present device is applied to the power window regulator switch device, the present device should not be limited thereto but can be applied generally to a motor controlling switch device for a reversible motor, such as a power sunroof switch device or a power curtain switch device.

In addition, the present device should not be limited to the embodiments thus far described with reference to the accompanying drawings but can naturally be modified in various manners within the spirit thereof. For example, overcurrent protecting shunt resistors may be connected in parallel with the restoring coil spring 123 acting as the restoring member.

As has been described hereinbefore, according to the present device, there is provided a motor controlling switch device in which the operating member is restored to its original position from the second operating position for the forward or reverse rotations through the first operating position when the motor is stopped. The knob is held in the second operating position by the retention between the depression piece and the holding portion. The restoring member of a configuration storing alloy is fed, when the knob is turned to at least the second operating position, with the electric current, which flows in forward rotation circuit and the reverse rotation circuit of the motor, so that it may be heated with the motor locking current to restore it to its original stretched configuration. As the restoring member is restored, the knob is returned from the second operating position to the original position through the first operating position. Thus, the present device is advantageous over the prior art in that the holding electromagnet can be dispensed with and that only one common restoring member is sufficient for the forward rotation circuit and the reverse rotation circuit of the motor, thereby to accordingly reduce the power consumption.

The device will now be described in the following with reference to FIGS. 31 to 38 in connection with its twelfth embodiment.

Reference numeral 201 designates a plastic casing which is formed into a substantially rectangular cylinder having its upper and lower ends opened. An insulator 202 forms part of the casing 201 in a manner to close the lower end of the casing 201. On the substantially central portion of the insulator 202, there are fixed blade holders 203 and 204 which are equipped with stationary contacts 205 and 206, and 207 and 208 at their two sides, respectively. At the two ends of the blade holder 203, there is supported in a rocking manner a blade 211 which has movable contacts 209 and 210 capable of coming into and out of contact with the stationary contacts 205 and 206. At the two ends of the blade holder 204, there is also supported in a rocking manner a blade 214 which has movable contacts 212 and 213 capable of coming into and out of contact with the stationary contacts 207 and 208. The stationary contact 205 and the movable contact 209, and the stationary contact 206 and the movable contact 210 constitute first and second switches 215 and 216, respectively. The stationary contact 207 and the movable contact 212, and the stationary contact 208 and the movable contact 213 constitute third and fourth switches 217 and 218, respectively. A knob 220 acting as an operating member is rotatably fitted on the upper end of the casing 201 through a pin 219. The knob 220 has its central portion extended to form an operating portion 221 protruded downward. The operating portion 221 is formed with holes 221a and 221b which are opened downward. In these holes 221a and 221b, there are arranged depressing pieces 222 and 223 and coil springs 224 and 224 such that the leading ends of one depressing piece 222 and the other depressing piece 223 are urged to contact with the blades 211 and 214 by the biasing forces of the coil springs 224 and 224, respectively. The blades 211 and 214 are formed at their respective central portions with recesses 211a and 214a. These recesses 211a and 214a are made the lowest at their centers and are defined by sloped surfaces 211b and 211b, and 214b and 214b which are sloped gradually upward to the two sides. These slopes surfaces 211b and 211b, and 214b and 214b are extended to lands 211c and 211c, and 214c and 214c which are located at the outer end portions to act as holding portions. In case the knob 220 is returned to the original position shown in FIGS. 31 and 32, the depressing pieces 222 and 223 have their respective leading ends in contact with the deepest portions of the recesses 211a and 214a. At this time, the blade 211 has its movable contact 210 in contact with the stationary contact 206 and its movable contact 209 out of contact with the stationary contact 205, and the blade 214 has its movable contact 212 in contact with the stationary contact 207 and its movable contact 213 out of contact with the stationary contact 208. Then, the first and fourth switches 215 and 218 are in their off states, and the second and third switches 216 and 217 are in their on states. Reference numerals 225 and 226 designate restoring coil springs of a configuration storing alloy acting as restoring members. These restoring coil springs 225 and 226 have original stretched configurations which are automatically restored when they are heated in their compressed states. The restoring coil springs 225 and 226 are sandwiched between the right and left end portions of the knob 205 and the insulator 202 such that their respective upper end portions are fitted and held on holding protrusions 220a and 220b extended from the lower surface of the knob 220 and their respective lower end portions fitted and held in recesses 202a and 202b formed in the insulator 202. From the respective upper ends of the restoring coil springs 225 and 226, there are extended straight portions 225a and 226a which extend through slit-shaped holes 201a and 201b formed in the casing 201. Other straight portions 225b and 226b extend from the respective lower ends of the restoring coil springs 225 and 226 and led out through holes 202c and 202d formed in the insulator 202.

Figure 35:
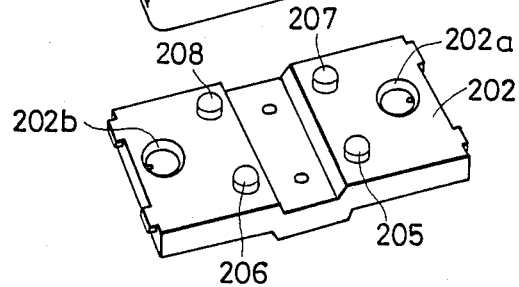
Figure 35:
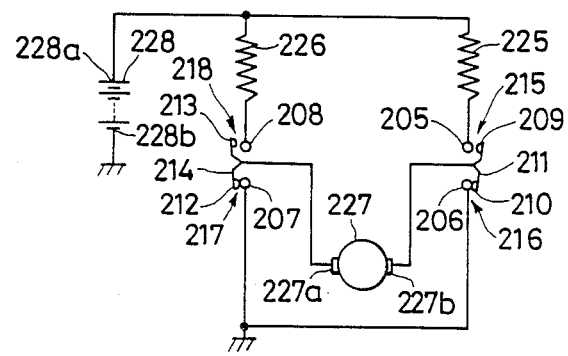

Now, the construction of the electric circuit will be described with reference to FIG. 35. Reference numeral 227 designates a two-brush type motor for driving an automobile's power window regulator. This motor 227 has a forward rotation terminal 227a and a reverse rotation terminal 227b. When the motor 227 is rotated in the forward direction, the window glass is moved downward to open the window. When the motor 227 is rotated in the reverse direction, the window glass is moved upward to close the window. The forward rotation terminal 227a is connected with the blade 214 through the blade holder 204, and the reverse rotation terminal 227b is connected with the blade 211 through the blade holder 203. Numeral 228 designates a battery acting as a DC power source, which has its negative terminal grounded to the earth and its positive terminal connected with the straight portions 225a and 226a of the restoring coil springs 225 and 226. The straight portion 225b of the restoring coil spring 225 is connected with the stationary contact 205, and the straight portion 226b of the restoring coil spring 226 is connected with the stationary contact 208. The stationary contacts 206 and 207 are grounded to the earth.

Figure 31:
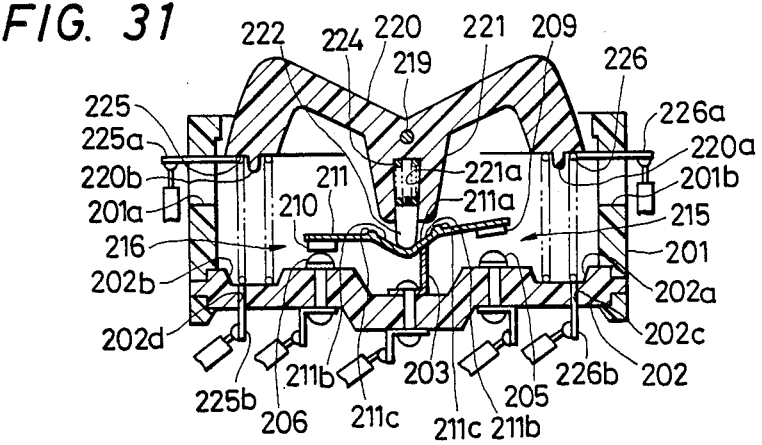
FIGS. 31 to 38 show the twelfth embodiment of the present device.
Figure 32:
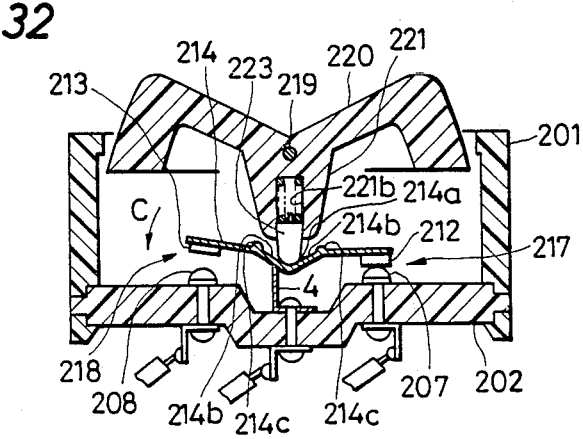
Figure 33:
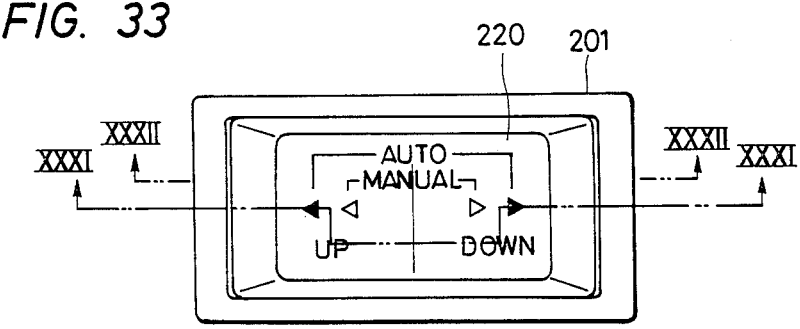
Figure 34:
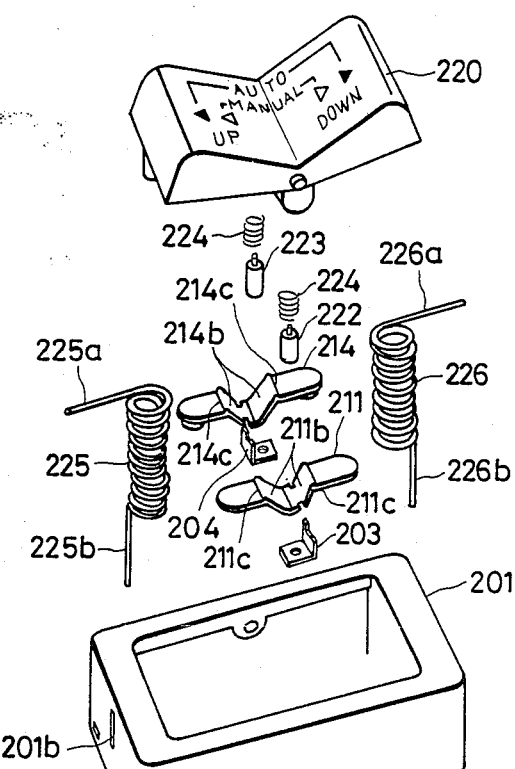
Figure 36:
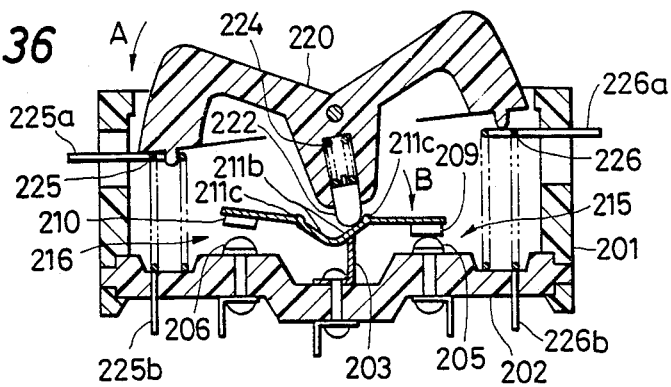
Figure 37:
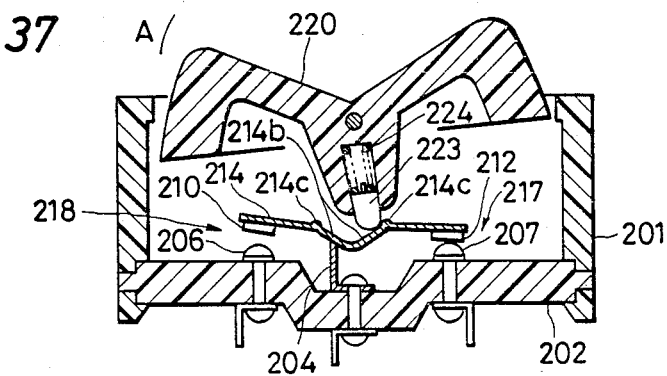

The operations of the present embodiment will be described in the following. When the right end portion of the knob 220 in the original position, as shown in FIGS. 31 and 32, is depressed to turn the knob 220 in the direction of arrow A, the depressing pieces 222 and 223 ride over the respective sloped surfaces 211b and 214b of the recesses 211a and 214a of the blades 211 and 214, while compressing the compressing coil springs 224 and 224, and then abut against the lands 211c and 214c at its leading end with resistance. Thus, the knob 220 has been set at a first operating position for the closing operation, as shown in FIGS. 36 and 37. In this operation, the restoring coil spring 225 is also compressed by the knob 220. When the knob 220 is in the first operating position, the blade 211 turns in the direction of arrow B on the blade holder 203. As a result, the movable contact 210 is brought out of contact with the stationary contact 206 to turn off the second switch 216, and the movable contact 209 is brought into contact with the stationary contact 205 to turn on the first upward switch 215. At this time, the blade 214 has its state left unchanged to continue the on state of the third switch 217. As a result, the motor 227 has its reverse rotation terminal 227b connected with the positive terminal 228a of the battery 228 through the first switch 215 and its forward rotation terminal 227a connected with the negative terminal 228b of the battery 228 through the third switch 217 so that the motor 227 is rotated in the reverse direction to move the window glass upward. When the knob 220 is then released from the depressing force, the actions of the depressing pieces 222 and 223 receiving the spring forces of the coil springs 224 and 224 in combination with the sloped surfaces 211b and 214b of the recesses 211a and 214a cause the depressing pieces 222 and 223 to slide down the sloped surfaces 211b and 214b. As a result, the knob 220 is turned in the direction opposite to that of the arrow A to restore its original position shown in FIGS. 31 and 32 so that the first upward switch 215 is turned off and the second switch 216 is turned on to stop the motor 227. As the knob 220 is turned, the restoring coil spring 225 is also restored to its stretched state by its own elastic force. Thus, the window glass has been stopped at the desired position.

Figure 38:
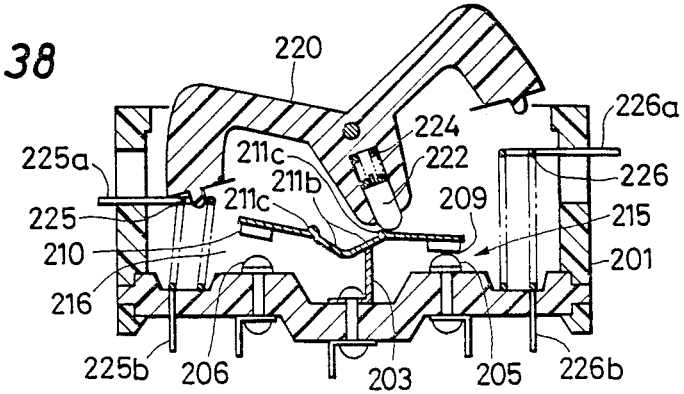

When the knob 220 in the first operating position shown in FIGS. 36 and 37 is depressed so that it is further turned in the direction of the arrow A, the depressing pieces 222 and 223 is moved over the lands 211c and 214c of the blades 211 and 214 until they are retained at the right-hand portions of the lands 211c and 214c (as shown in FIG. 38). The knob 220 is then in a second operation position for the closing operation. In this operation, the restoring coil spring 225 is depressed. Then, the retaining force of the lands 211c and 214c by the depressing pieces 222 and 223 is greater than the restoring elastic force of the restoring coil spring 225 so that the knob 220 is held in the second operating position. Like the above description, the motor 227 is rotated in the reverse direction to move the window glass upward. When the window glass reaches its highest position so that the window is fully opened, the motor 227 is stopped, and a large locking current flows in the motor 227. This locking current also flows in the restoring coil spring 225 to heat the latter. When the temperature of the restoring coil spring 225 is raised to a predetermined level, the coil spring 225 is restored to its original stretched configuration, as shown in FIG. 1. In this connection, the restoring force is designed so that it is larger than the retaining forces of the lands 211c and 214c, which are established by the depressing pieces 222 and 223. Accordingly, the depressing pieces 222 and 223 are forcibly released from the retention by the lands 211c and 214c to slide down the sloped surfaces 211b and 214b of the recesses 211a and 214a so that the knob 220 is returned to its original position from the second operating position through the first operating position. Then, the first upward switch 215 is turned off, but the second switch 216 is turned on to stop the motor 227 as described above.

When the right end portion of the knob 220 is depressed so that the knob 220 is turned in the direction opposite to the direction of the arrow A, the switch device operates on the same operating principle as where the window glass is moved downward by turning the knob 220 in the direction of arrow A. When the right end portion of the knob 220 is depressed, the depressing pieces 222 and 223 ride over the sloped surfaces 211b and 214b of the recesses 211a and 214a and then abut against the lands 211c and 214c. Thus, the knob 220 is in a first operating position for the opening operation. When the right end portion of the knob 220 is further depressed, the depressing pieces 222 and 223 are moved over the lands 211c and 214c until they are retained at the left-hand portions of the lands 211c and 214c. Thus, the knob 220 is in a second operating position for the opening operation. When the knob 220 is moved to the first or second operating position, the restoring coil spring 226 is depressed and the blade 214 is rocked in the direction of arrow C by the depressing piece 223 so that the movable contact 212 comes out of the stationary contact 207 whereas the movable contact 213 comes into contact with the stationary contact 208 to turn on the third switch 217 and to turn off the fourth downward switch 218. As a result, in case the knob 220 is in either the first or second operating position, the supply voltage of the battery 228 is applied between the forward rotation terminal 227a and the reverse rotation terminal 227b of the motor 227 through the restoring coil spring 226 to rotate the motor 227 in the forward direction thereby to move the window glass downward to open the window. If, in this case, the knob 220 is in the first operating position, it is returned to the original position by the actions of the sloped surfaces 211b and 214b, the compression coil springs 224 and 224, and the depressing pieces 222 and 223 if the knob 220 is released from the depressing forces. Thus, the fourth upward switch 218 is turned off. When, on the other hand, the knob 220 is in the second operating position for the closing operation, even if the depression force is eliminated, the knob 220 is held in the second operating position because the depressing pieces 222 and 223 are retained by the lands 211c and 214c, and the fourth switch 218 is held in the on state. Thereafter, when the window glass reaches its lowermost position to fully open the window, the motor 227 is stopped in the locking manner, and the locking current flows in the motor 227 and the restoring coil spring 226. As a result, the restoring coil spring 226 is automatically restored to original stretched configuration so that the knob 220 is returned to its original position from the second operating position through the first operating position. Thus, the fourth switch 218 is turned off, but the third switch 217 is turned on to stop the motor 227. When right-hand end portion of the knob 220 is turned in the direction opposite to the direction of the arrow A, the blade 211 is not rocked so that the first switch 215 is in off state whereas the second switch 216 is in the on state.

According to the present embodiment, the lands 211c and 214c for retaining the depressing pieces 222 and 223 are formed on the blades 211 and 214 so as to hold the knob 220 in the second operation position. Between the right-end and left-end portions of the knob 220 and the bottom wall of the insulator 202, respectively, there are sandwiched the restoring coil springs 225 and 226 which are made of a configuration storing alloy. These restoring coil springs 225 and 226 are fed with the electric current which flows in the motor 227. When the window glass is fully opened or fully closed so that the motor 227 is stopped, the restoring coil springs 225 and 226 are heated with the locking current to restore their original stretched state. Thus, the knob 220 is automatically restored to its original position against the retention of the land 211c or 214c, which is provided by the depressing piece 222 or 223. As a result, an electromagnet is not required for holding the knob 220 in the second operating position, which is different from the prior art. The switch device can be manufactured at an accordingly low cost and with an accordingly low power consumption.

Figure 39:
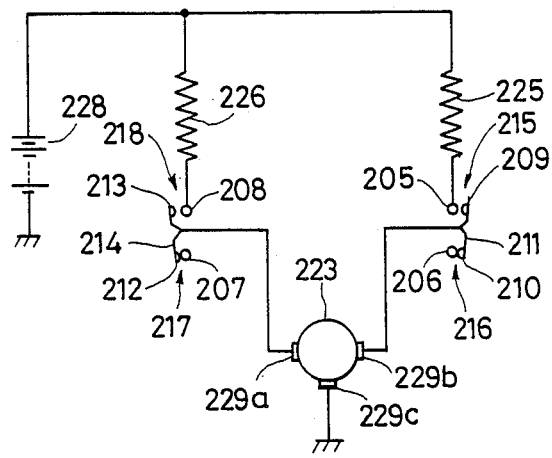
FIG. 39 is an electric circuit diagram showing a thirteenth embodiment of the present device.

FIG. 39 shows a thirteenth embodiment of the present device, and only components different from those of the twelfth embodiment will be described in the following. Reference numeral 229 designates a three-brush type motor for driving a power window regulator. The three-brush type motor 229 has a forward rotation terminal 229a, a reverse rotation terminal 229b and a common terminal 229c, of which the reverse rotation terminal 229b is connected with the blade 211 through the blade holder 203; the forward rotation terminal 229a is connected with the blade 214 through the blade holder 204; and the common terminal 229c is grounded to the earth. The stationary contacts 206 and 207 are open. When the knob 220 is turned in the direction of the arrow A to turn on the first switch 215, the motor 229 is rotated in the reverse direction to move the window glass upward like the first embodiment. When, on the other hand, the knob 220 is turned in the direction opposite to the direction of the arrow A to turn on the fourth switch 18, the motor 229 is rotated in the forward direction to move the window glass downward like the first embodiment. The energization and deenergization of the motor 229 according to the turns of the knob 220 are similar to those of the first embodiment, and the stopping operation upon the deenergization is omitted here. Thus, effects similar to those of the first embodiment can also be attained by the present embodiment.

Figure 40:
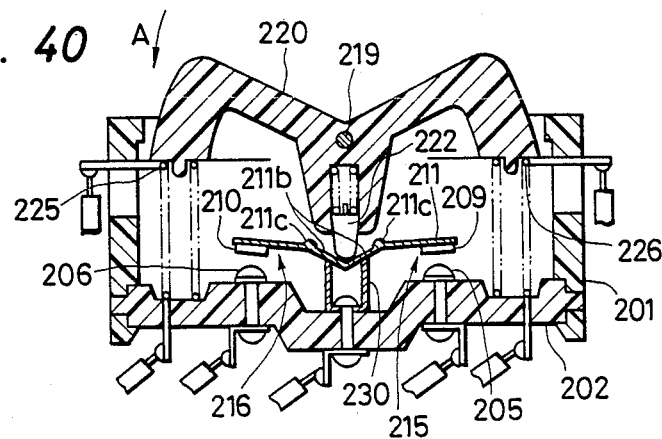
FIGS. 40 and 41 show the fourteenth embodiment of the present device.
Figure 41:
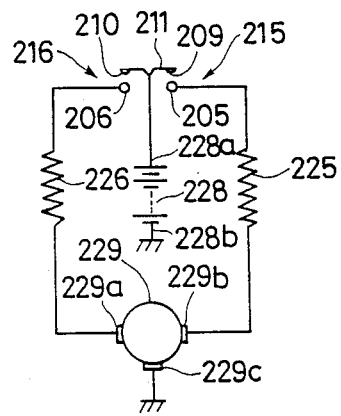

FIGS. 40 and 41 show a fourteenth embodiment of the present device, and only components different from those of the first and second embodiments will be described in the following. The blade holder 203 is replaced by a substantially C-shaped blade holder 330, from which are omitted the blade holder 204, the stationary contacts 207 and 208, the blade 214, the third and fourth switches 17 and 18 and the depressing piece 223. The battery 228 has its positive terminal 228a connected with the blade 211 through the blade holder 330 and its negative terminal 228b grounded to the earth. The stationary contact 205 is connected with the reverse rotation terminal 229b of the motor 229 through the restoring coil spring 225, and the stationary contact is connected with the forward rotation terminal 229a of the motor 229 through the restoring coil spring 226. When the knob 220 is in its original position, as shown in FIG. 40, the movable contacts 209 and 210 are out of contact with the stationary contacts 205 and 206, respectively, so that the first and second switches 215 and 216 are off. When the knob 220 is turned in the direction of the arrow A or in the opposite direction to the first operating position, the motor 229 is rotated in the forward or reverse direction. When the knob 220 is further turned from the first operating position, the depressing piece 222 comes into engagement with the land 211c until it is held in the second operating position. If, in this state, the motor 229 is locked from its rotations, the locking current flows in the restoring coil spring 225 and 226 so that this coil spring 225 and 226 is heated to restore its original stretched configuration to return the knob 220 from the second operating position to the original position shown in FIG. 40. Thus, effects similar to those of the first embodiment can be attained.

The individual embodiments thus far described are directed to the case in which the present device is applied to the power window regulator switch device. The present device should not be limited thereto but can be applied generally to a motor controlling switch device such as a power sunroof switch device or a power curtain switch device.

As has been described hereinbefore, the present device is advantageous over the prior art in that the holding electromagnet can be dispensed with to accordingly reduce the power consumption.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of the general inventive concept as defined by the appended claims and their equivalents.

I claim:

1. A motor controlling switch device comprising:
   a casing;
   an operating member provided in said casing, said operating member being movable from an original position to a first operating position and from said first operating position to a second operating position in response to the application of an operating force to said operating member;
   a depressing piece disposed in one of said casing and said operating member;
   first restoring means acting in cooperation with said depressing piece for restoring said operating member from said first operating position to said original position when said operating force is removed from said operating member and said operating member has moved to said first operating position;
   holding means for holding said operating member in said second operating position when said operating member moves through said first operating position to said second operating position, said holding means comprising a holding protrusion acting in cooperation with said depressing piece;
   switch circuit means for supplying a locking current to an electric drive means in response to the movement of the operating member; and
   second restoring means disposed in said casing for restoring said operating member from said second operating position to said original position, said switch circuit means supplying said second restoring means with said locking current when said operating member moves to said second operating position, said second restoring means including at least one restoring member made of a material capable of being restored to an original stretched configuration when supplied with said locking current to thereby restore the operating member to said original position from said second operating position through said first operating position.

2. The device of claim 1 wherein said depressing piece is disposed in a recess formed in said operating member and a spring is disposed between said depressing piece and said operating member, said depressing piece being spring-biased toward said first restoring means and said holding means.

3. The device of claim 2, wherein said first restoring means includes a sloped surface formed on an inner bottom surface of said casing, and said holding means includes a holding surface formed on the inner bottom surface of said casing.

4. The device of claim 2, wherein said depressing piece is disposed in a recess formed in said casing and a spring is disposed between said depressing piece and said casing, and depressing piece being spring-biased toward said first restoring means and said holding means.

5. The device of claim 4, wherein said first restoring means includes a sloped surface formed on said operating member, and said holding means includes a holding surface formed on said operating member.

6. The device of claim 1, wherein said second restoring means comprises a coil spring.

7. The device of claim 1, wherein said switch circuit means includes a movable contact and a moving member for holding said movable contact, said moving member being movable in response to the movement of the operating member.

8. The device of claim 7, wherein said switch circuit means further includes a common contact, a first pair of stationary contacts and a second pair of stationary contacts, said first and second pairs of stationary contacts being selectively connected to said electric drive means through said movable contact in response to the movement of the operating member.

9. The device of claim 8, wherein said electric drive means includes a three-brush motor.

10. The device of claim 8, wherein said movable contact includes a pair of contact pieces, and said electric drive means includes a two-brush motor.

11. The device of claim 8, wherein said first and second stationary contacts are integrally formed, and said electric drive means includes a three-brush motor.

12. The device of claim 8, wherein said first and second stationary contacts are integrally formed, and said electric drive means includes a two-brush motor.

13. The device of claim 1, wherein said operating member is pivotally mounted on said casing and said second restoring means includes a pair of restoring members interposed between said operating member and said casing.

14. The device of claim 1, wherein said switch circuit means includes a first movable contact and a first pair of stationary contacts, said first movable contact selectively contacting said first stationary contact in response to the movement of said operating member.

15. The device of claim 14, wherein said movable contact and said stationary contacts are provided in the wall of said casing for contacting said operating member when said operating member is in said original position.

16. The device of claim 14, wherein said switch circuit means further includes a second movable contact and second pair of stationary contacts, said second movable contact selectively contacting said second pair of stationary contacts in response to the movement of said operating member.

17. The device of claim 16, wherein said electric drive means includes a two-brush motor.

18. The device of claim 16, wherein said electric drive means includes a three-brush motor.

19. A motor controlling switch device comprising:
a casing;
an operating member provided in said casing, said operating member being movable from an original position to a first operating position and from said first operating position to a second operating position in response to the application of an operating force to said operating member;
a depressing piece disposed in one of said casing and said operating member;
first restoring means acting in cooperation with said depressing piece for restoring said operating member from said first operating position to said original position when said operating force is removed from said operating member and said operating member has moved to said first operating position;
holding means for holding said operating member in said second operating position when said operating member is moved through said first operating position to said second operating position, said holding means comprising a holding protrusion acting in cooperation with said depressing piece;
forwarding and reverse rotation switch means for establishing forward and reverse motor rotation circuits by rotating an electric motor in the forward and reverse directions when said operating member moves to said first and second operating positions, said forward and reverse rotation switch means supplying a locking current to said electric motor in response to the movement of the operating member; and
second restoring means disposed in said casing for restoring said operating member from said second operating position to said original position, said switch means supplying said second restoring means with said locking current when said operating member moves to said second operating position, said second restoring means including at least one restoring member made of a material capable of being restored to an original stretched configuration when supplied with said locking current to thereby restore the operating member to said original position from said second operating position through said first operating position.

20. The device of claim 19, wherein said depressing piece is disposed in a recess formed in said operating member and a spring is disposed between said depressing piece and said operating member, said depressing piece being spring-biased toward said first restoring means and said holding means.

21. The device of claim 20, wherein said first restoring means includes a sloped surface formed on an inner bottom surface of said casing, and said holding means includes a holding surface formed on the inner bottom surface of said casing.

22. The device of claim 19, wherein said depressing piece is disposed in a recess formed in said casing, and a spring is disposed between said depressing piece and said operating member, said depressing piece being spring-biased toward said first restoring means and said holding means.

23. The device of claim 22, wherein said first restoring means includes a sloped surface formed on said operating member, and said holding means includes a holding surface formed on said operating member.

24. The device of claim 19, wherein said switch means includes a first movable contact and a first pair of stationary contacts, said first movable contact selectively contacting said first pair of stationary contacts in response to the movement of said electric motor in the forward rotational direction.

25. The device of claim 19, wherein said movable contact and said stationary contacts are provided in the wall of said casing for contacting said operating member when said operating member is in the original position.

26. The device of claim 25, wherein said switch means includes a second movable contact and second set of stationary contacts, said second movable contact selectively contacting said second pair of stationary contacts in response to the movement of said electric motor in the reverse rotational direction.

27. The device of claim 19, wherein said second restoring means is received in a recess defined by said casing and by a moving member engaging said operating member and movable with said operating member.

28. The device of claim 19, wherein said switch circuit means includes a movable contact and a moving member for holding said movable contact, said moving member being movable in response to the movement of the operating member.

29. The device of claim 28, wherein said switch circuit means further includes a common contact, a first pair of stationary contacts and a second pair of stationary contacts, said first and second pairs of stationary contacts being selectively connected to said electric motor through said movable contact in response to the movement of the operating member.

30. The device of claim 29, wherein said first and second pair of stationary contacts are integrally formed.

31. The device of claim 19, wherein said second restoring means comprises a coil spring.

32. The device of claim 19, wherein said motor is a three-brush motor.

33. The device of claim 19, wherein said motor is a two-brush motor.

34. A motor controlling switch device comprising:
a casing having a plurality of stationary contacts;
a plurality of blades disposed in a rocking manner in said casing and including a plurality of movable contacts contacting said stationary contacts;
an operating member provided in said casing, said operating member being movable from an original position to a first operating position and from said first operation position to a second operating position in response to the application of an operating force to said operating member,
a plurality of switches formed by said movable contacts and said stationary contacts, said switches supplying a locking current to an electric motor in response to the movement of said operating member;
a plurality of depressing pieces disposed in said operating member for applying a depressing force to said blades, said depressing force biasing said operating member into said original position, thereby bringing the movable contacts out of contact with said stationary contacts and turning said switches off, and rocking said blades when said operating member moves to said first and second operating positions, thereby bringing the movable contacts into contact with said stationary contacts and turning said switches on;

first restoring means comprising a plurality of sloped surfaces formed on said blades and acting in cooperation with said depressing piece for restoring said operating member from said first operating position to said original operating position when said operating force is removed from said operating member and said operating member has moved to the first operating position;

holding means comprising a plurality of holding surfaces formed on said blades and acting in cooperation with said depressing piece for holding said operating member in said second position when said operating member moves from said first operating position to said second operating position; and second restoring means disposed in said casing for restoring said operating member from said second operating position to said original position, said switches supplying said restoring means with said locking current when said operating member moves to said second operating position, said second restoring means including a least one restoring member being made of a material capable of being restored to an original stretched configuration when supplied with said locking current to thereby restore the operating member to said original position from said second operating position through said first operating position.

35. The device of claim 34, wherein said restoring member is in the form of a coil spring.

36. The device of claim 34, wherein said electric motor is a two-brush motor and is electrically connected to said movable contacts.

37. The device of claim 34, wherein said electric motor is a three-brush motor and is electrically connected to said movable contacts.

38. A motor controlled switch device comprising:

a casing;

an operating member provided in said casing, said operating member being movable from an original operating position to a first operating position and from said first operating position to a second operating position;

a depressing piece disposed in said operating member;

a first restoring means acting in cooperation with said depressing piece for restoring said operating member from said first operating position to said original position when said operating force is removed from said operating member and said operating member has moved to said first operating position;

holding means for holding said operating member in said second operating position when said operating member moves through said first operating position to said second operation position;

a blade disposed in a rocking manner in said casing said first restoring means and said holding means being disposed on said blade;

switch circuit means for supplying a locking current to an electric drive means in response to the movement of the operating member; and second restoring means disposed in said casing for restoring from operating member from said second operation position to said original position, said switch circuit means supplying said second restoring means with said locking current when said operating member moves to said second operating position, said second restoring means including at least one restoring member made of a material capable of being restored to an original stretched configuration when supplied with said locking current to thereby restore the operating member to said original position from said second position through said first operating position.

39. The device of claim 38, wherein said depressing piece is disposed in a recess formed in said operating member, said depressing piece being spring-biased toward said blade.

40. The device of claim 38, wherein said restoring means includes a sloped surface formed on an inner bottom surface of said casing, and said holding means includes a holding surface formed on the inner bottom surface of said casing.

41. The device of claim 38, wherein said second restoring means include a coil spring.

42. The device of claim 38, wherein said operating member is pivotally mounted on said casing, and said second restoring means includes a pair of restoring members each interposed between said operating member and said casing.

43. The device of claim 38, wherein said electric drive means includes a three-brush motor.

* * * * *

UNITED STATES PATENT AND TRADEMARK OFFICE
CERTIFICATE OF CORRECTION

PATENT NO. : 4,876,493

DATED : October 24, 1989

INVENTOR(S) : Masaru Suzuki

It is certified that error appears in the above-identified patent and that said Letters Patent is hereby corrected as shown below:

Claim 30, column 28, line 27, change "pair" to --pairs--.

Claim 34, column 28, line 52, change "operation" to --operating--.

Signed and Sealed this

Fourteenth Day of January, 1992

Attest:

HARRY F. MANBECK, JR.

*Attesting Officer*           *Commissioner of Patents and Trademarks*